(12) United States Patent
Vanderhoek et al.

(10) Patent No.: US 8,267,261 B2
(45) Date of Patent: Sep. 18, 2012

(54) RACK FOR TRANSPORTATION AND DISPLAY OF PLANTS

(76) Inventors: Wiebe S. Vanderhoek, Lynden, WA (US); Mike Van Wingerden, Blaine, WA (US)

(*) Notice: Subject to any disclaimer, the term of this patent is extended or adjusted under 35 U.S.C. 154(b) by 51 days.

(21) Appl. No.: 12/586,421

(22) Filed: Sep. 21, 2009

(65) Prior Publication Data

US 2010/0096344 A1  Apr. 22, 2010

Related U.S. Application Data

(63) Continuation-in-part of application No. 12/226,085, filed on Oct. 21, 2008, now abandoned.

(60) Provisional application No. 60/790,201, filed on Apr. 7, 2006.

(51) Int. Cl.
*A47B 47/00* (2006.01)
*A47B 57/04* (2006.01)

(52) U.S. Cl. .................. 211/150; 211/187; 108/143

(58) Field of Classification Search ............ 211/46, 211/59.2, 59.3, 71.01, 85.23, 88.03, 99, 126.15, 211/150, 151, 162, 170, 186, 187, 190; 108/102, 108/106, 107, 143 X, 147.11, 147.17, 177; 280/47.35, 79.11, 79.3, 651; 312/249.11, 312/323

See application file for complete search history.

(56) References Cited

U.S. PATENT DOCUMENTS

| | | | |
|---|---|---|---|
| 462,082 A | 10/1891 | High | |
| 638,443 A | 12/1899 | Canedy | |
| 870,835 A * | 11/1907 | Loew | 211/133.1 |
| 948,728 A * | 2/1910 | Hendricks | 276/44 |
| 1,577,583 A | 6/1925 | McCartney | |
| 1,691,621 A * | 11/1928 | Young | 280/79.3 |
| 1,707,576 A * | 4/1929 | Schubert | 211/182 |
| 2,315,595 A * | 4/1943 | Chappory | 211/186 |
| 2,478,458 A * | 8/1949 | Carter et al. | 211/71.01 |
| 2,484,996 A * | 10/1949 | Hatch | 211/150 |
| 2,562,497 A * | 7/1951 | Klein | 108/107 |
| 2,680,522 A * | 6/1954 | Temple | 108/59 |
| 2,827,302 A * | 3/1958 | Skyrud | 280/33.998 |
| 2,953,254 A * | 9/1960 | Schnelle | 211/46 |
| 3,081,972 A * | 3/1963 | Gray, Jr. | 248/469 |
| 3,093,094 A * | 6/1963 | Oztekin | 248/242 |
| 3,101,148 A * | 8/1963 | Brown | 108/163 |
| 3,111,915 A * | 11/1963 | Gray | 108/6 |
| 3,232,442 A * | 2/1966 | Wilson | 211/133.2 |

(Continued)

FOREIGN PATENT DOCUMENTS

DE  3534794 A1 *  4/1987

(Continued)

*Primary Examiner* — Darnell Jayne
*Assistant Examiner* — Joshua Rodden
(74) *Attorney, Agent, or Firm* — Todd N. Hathaway

(57) ABSTRACT

A rack assembly for transportation and display of potted plants and similar articles. The rack includes vertical supports, and a plurality of trays that are slidingly supported on the posts. The trays are extensible from a retracted position in which the trays are arranged in compact, vertically spaced relationship for transportation, to a deployed position in which the trays extend on opposite sides in an alternating arrangement with increased vertical spacing, and are tilted to a downwardly angled orientation so that the plants can be readily viewed and accessed by customers and other personnel. The posts and trays are mounted on a mobile frame that includes stabilizer legs which prevent the assembly from tipping when the trays are in the deployed position. The posts and trays are removable from the frame, and can be broken down for storage.

7 Claims, 25 Drawing Sheets

U.S. PATENT DOCUMENTS

| | | | | |
|---|---|---|---|---|
| 3,252,434 A * | 5/1966 | Young, Jr. | | 108/181 |
| 3,265,404 A * | 8/1966 | Skufca | | 280/79.3 |
| 3,435,958 A * | 4/1969 | Chesley | | 211/133.2 |
| 3,487,951 A * | 1/1970 | Beltzung | | 211/133.2 |
| 3,527,360 A * | 9/1970 | Thielking | | 211/150 |
| 3,536,016 A * | 10/1970 | Chesley | | 108/181 |
| 3,608,920 A * | 9/1971 | Rubin | | 280/33.998 |
| 3,680,712 A | 8/1972 | Jurasek | | |
| 3,700,114 A * | 10/1972 | Myers | | 211/150 |
| 3,795,379 A * | 3/1974 | Gray | | 248/242 |
| 3,915,097 A * | 10/1975 | Young, Jr. | | 108/6 |
| 3,921,539 A * | 11/1975 | Berger | | 108/8 |
| 3,953,044 A * | 4/1976 | Wilson | | 280/33.996 |
| 3,977,529 A * | 8/1976 | Stroh | | 211/187 |
| 4,067,265 A * | 1/1978 | Watson | | 108/7 |
| 4,122,781 A | 10/1978 | Potter | | |
| 4,391,378 A * | 7/1983 | Secon | | 211/187 |
| 4,588,096 A * | 5/1986 | Story et al. | | 211/126.15 |
| 4,627,542 A * | 12/1986 | Fredrickson | | 211/150 |
| 4,890,748 A * | 1/1990 | Visser | | 211/133.1 |
| 4,978,013 A * | 12/1990 | Hogg | | 211/133.2 |
| 5,035,445 A * | 7/1991 | Poulin | | 280/763.1 |
| 5,090,724 A * | 2/1992 | Fiore | | 280/643 |
| 5,240,127 A * | 8/1993 | Levin et al. | | 211/186 |
| 5,251,973 A * | 10/1993 | Hazan | | 312/257.1 |
| 5,588,543 A * | 12/1996 | Finger | | 211/90.01 |
| 5,699,744 A * | 12/1997 | Lechman | | 108/109 |
| 5,718,441 A * | 2/1998 | Kern et al. | | 280/79.3 |
| 5,797,503 A * | 8/1998 | Stevens et al. | | 211/187 |
| 5,816,419 A | 10/1998 | Lamson | | |
| 5,833,083 A | 11/1998 | Miller | | |
| 5,853,181 A * | 12/1998 | Booras | | 280/47.35 |
| 6,073,786 A | 6/2000 | McCorkle, Jr. | | |
| 6,123,207 A | 9/2000 | Mast | | |
| 6,135,298 A * | 10/2000 | Lechman | | 211/106 |
| 6,135,299 A | 10/2000 | Burgess | | |
| 6,164,537 A | 12/2000 | Mariani et al. | | |
| 6,173,847 B1 * | 1/2001 | Zellner et al. | | 211/186 |
| 6,457,737 B1 * | 10/2002 | King | | 280/651 |
| 6,540,249 B2 * | 4/2003 | King | | 280/651 |
| 6,641,148 B2 * | 11/2003 | Schmidt | | 280/47.34 |
| 6,659,294 B1 * | 12/2003 | Simard | | 211/181.1 |
| 6,732,662 B2 * | 5/2004 | Welch et al. | | 108/109 |
| 6,799,689 B2 | 10/2004 | Langtry | | |
| 6,837,387 B2 * | 1/2005 | De La Fuente | | 211/181.1 |
| 7,128,221 B2 * | 10/2006 | Metcalf | | 211/59.2 |
| 7,857,329 B2 * | 12/2010 | Cai | | 280/47.35 |
| 7,963,408 B2 * | 6/2011 | Glover | | 211/126.15 |
| 2002/0023889 A1 | 2/2002 | Larbaletier | | |
| 2003/0085189 A1 * | 5/2003 | De La Fuente | | 211/181.1 |
| 2003/0160011 A1 * | 8/2003 | Langtry | | 211/59.2 |
| 2003/0196972 A1 * | 10/2003 | Webb | | 211/59.2 |
| 2003/0196980 A1 | 10/2003 | Ahn | | |
| 2004/0060884 A1 | 4/2004 | Nook et al. | | |
| 2004/0256341 A1 * | 12/2004 | Donnell et al. | | 211/187 |

FOREIGN PATENT DOCUMENTS

EP  309058 A2 *  3/1989

* cited by examiner

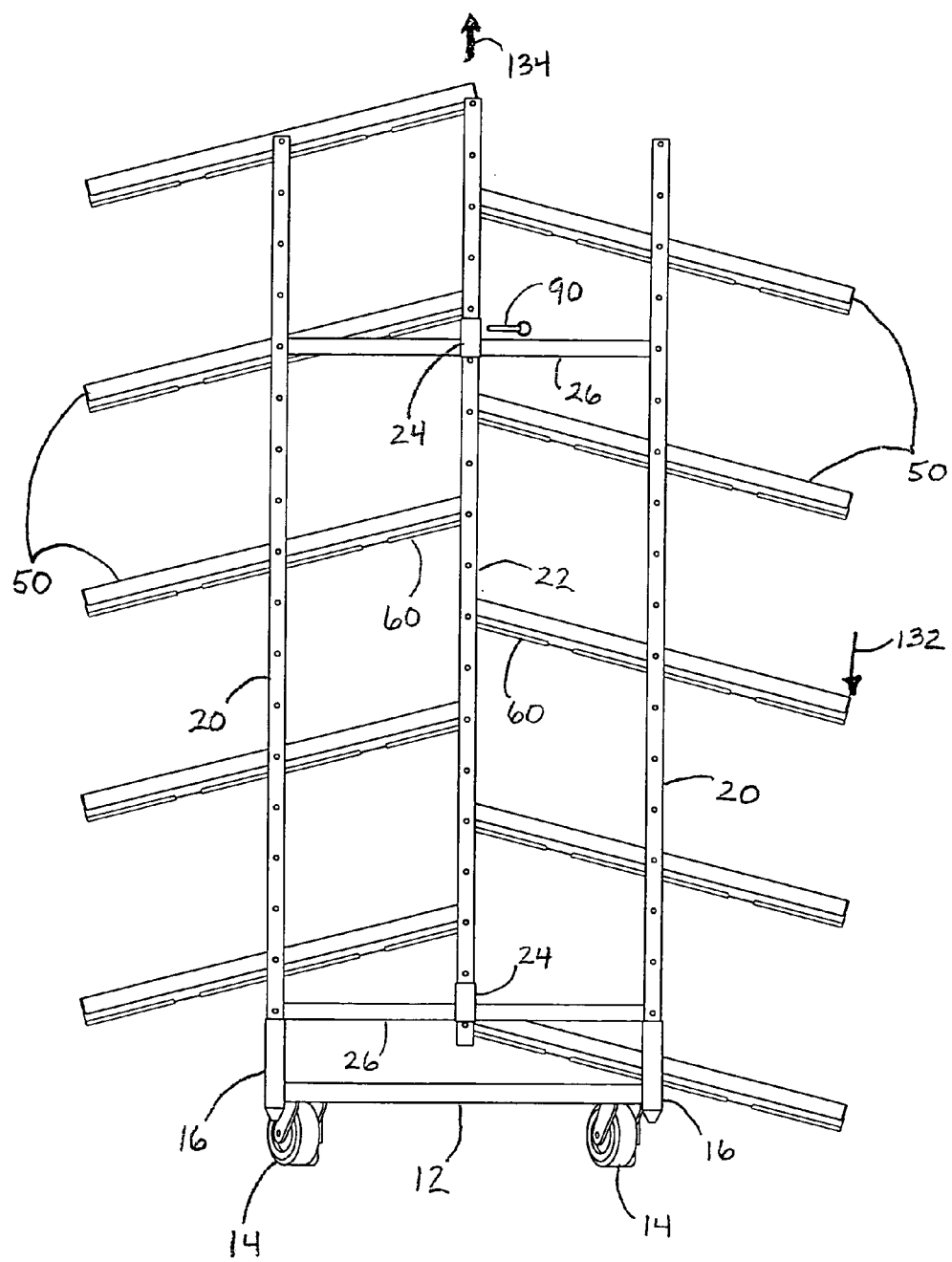

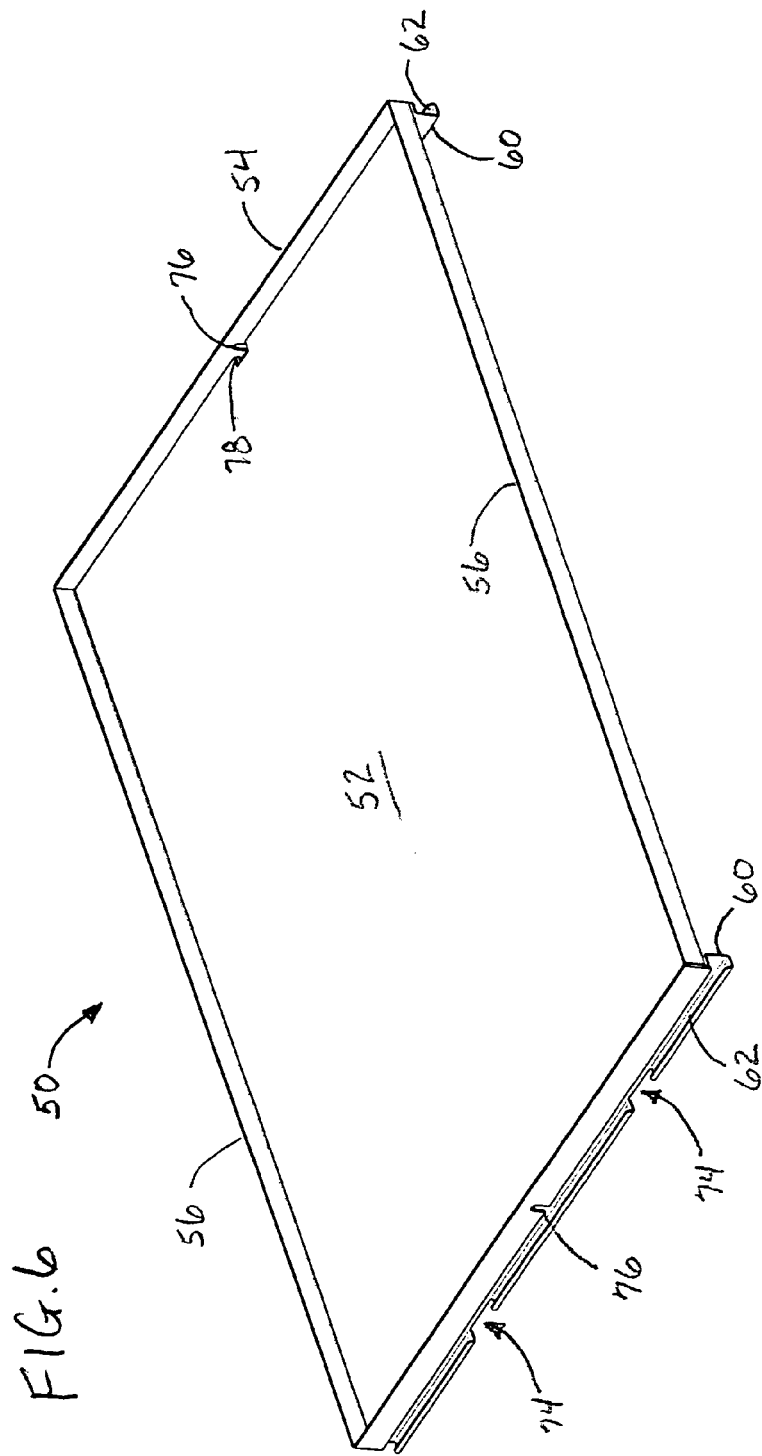

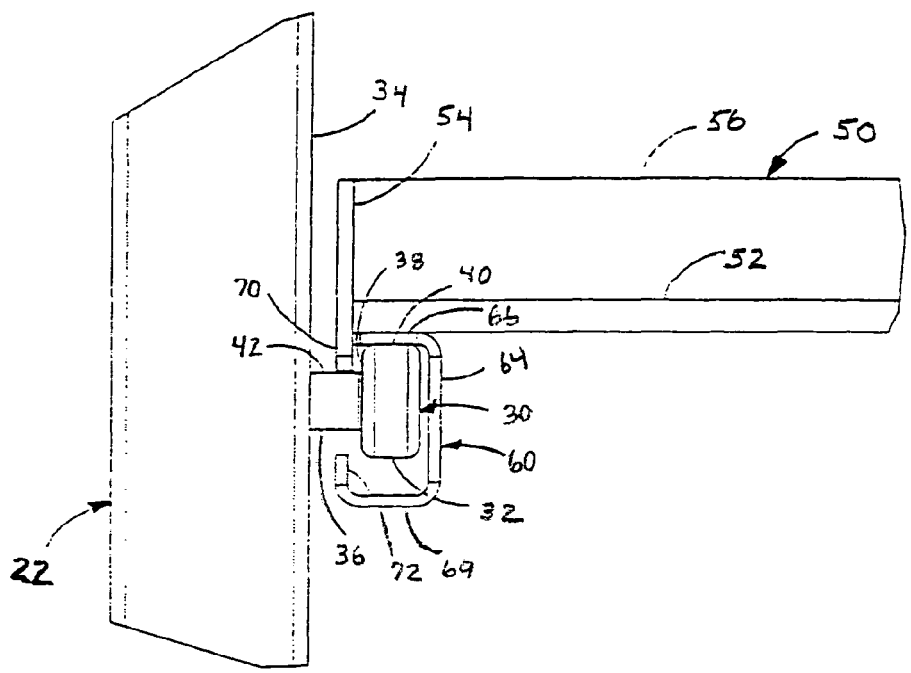
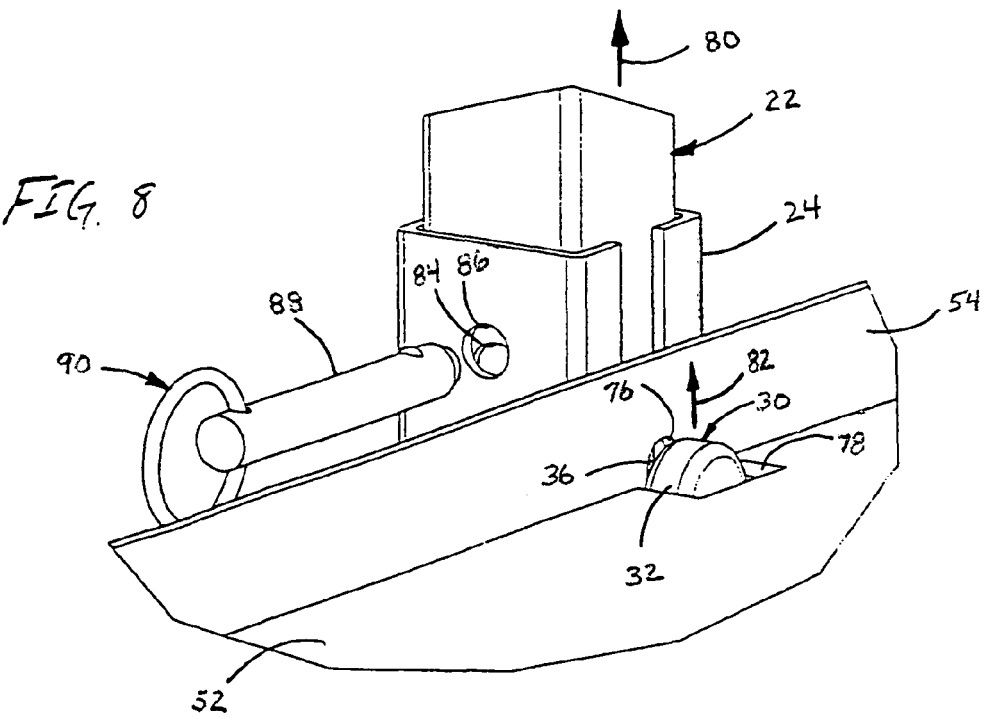

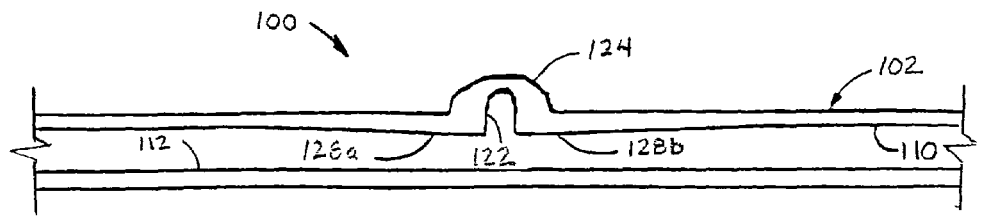
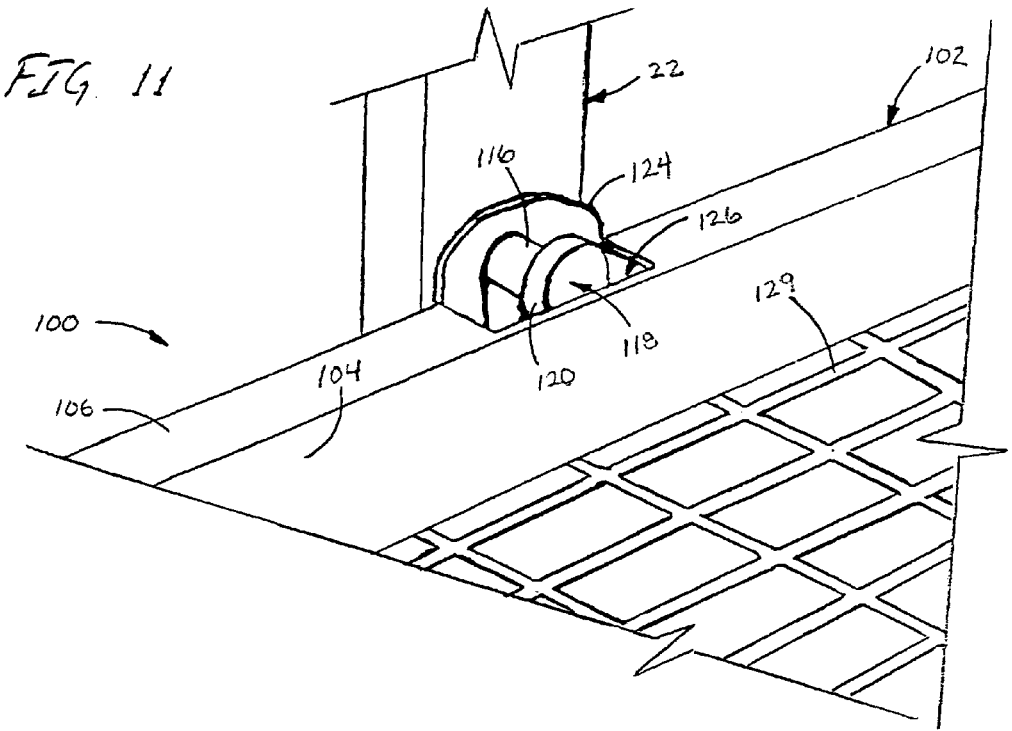

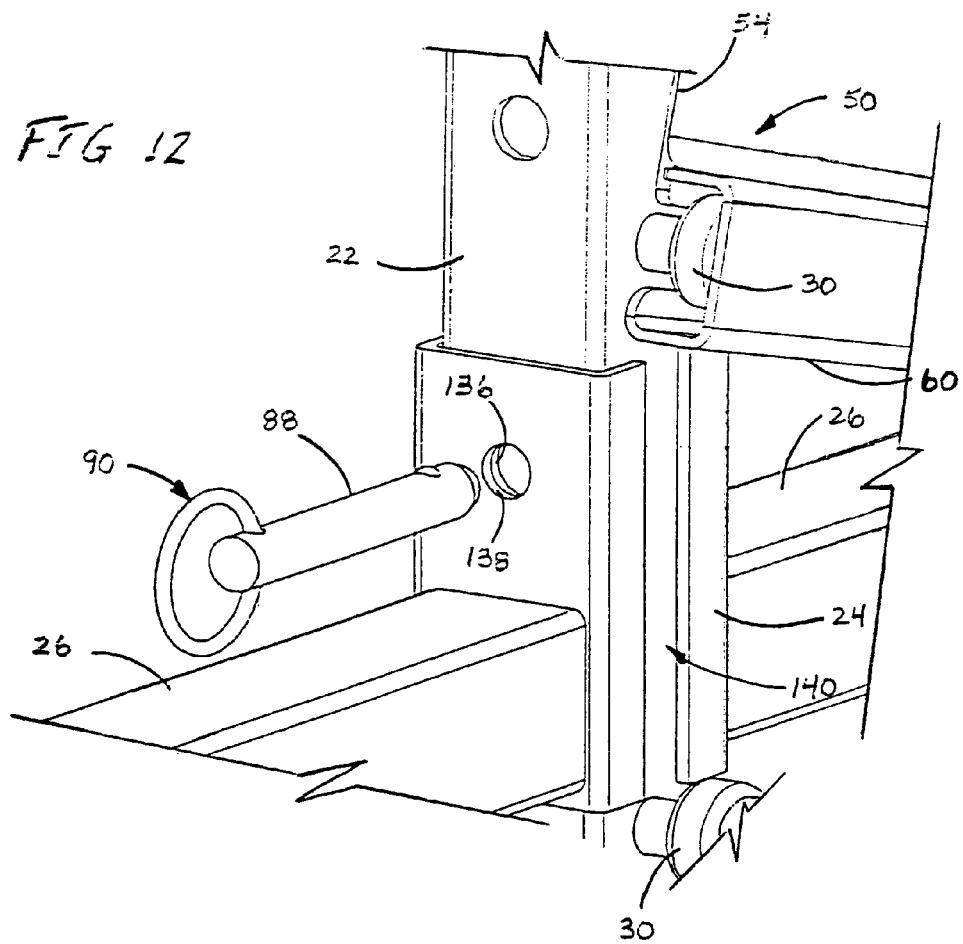

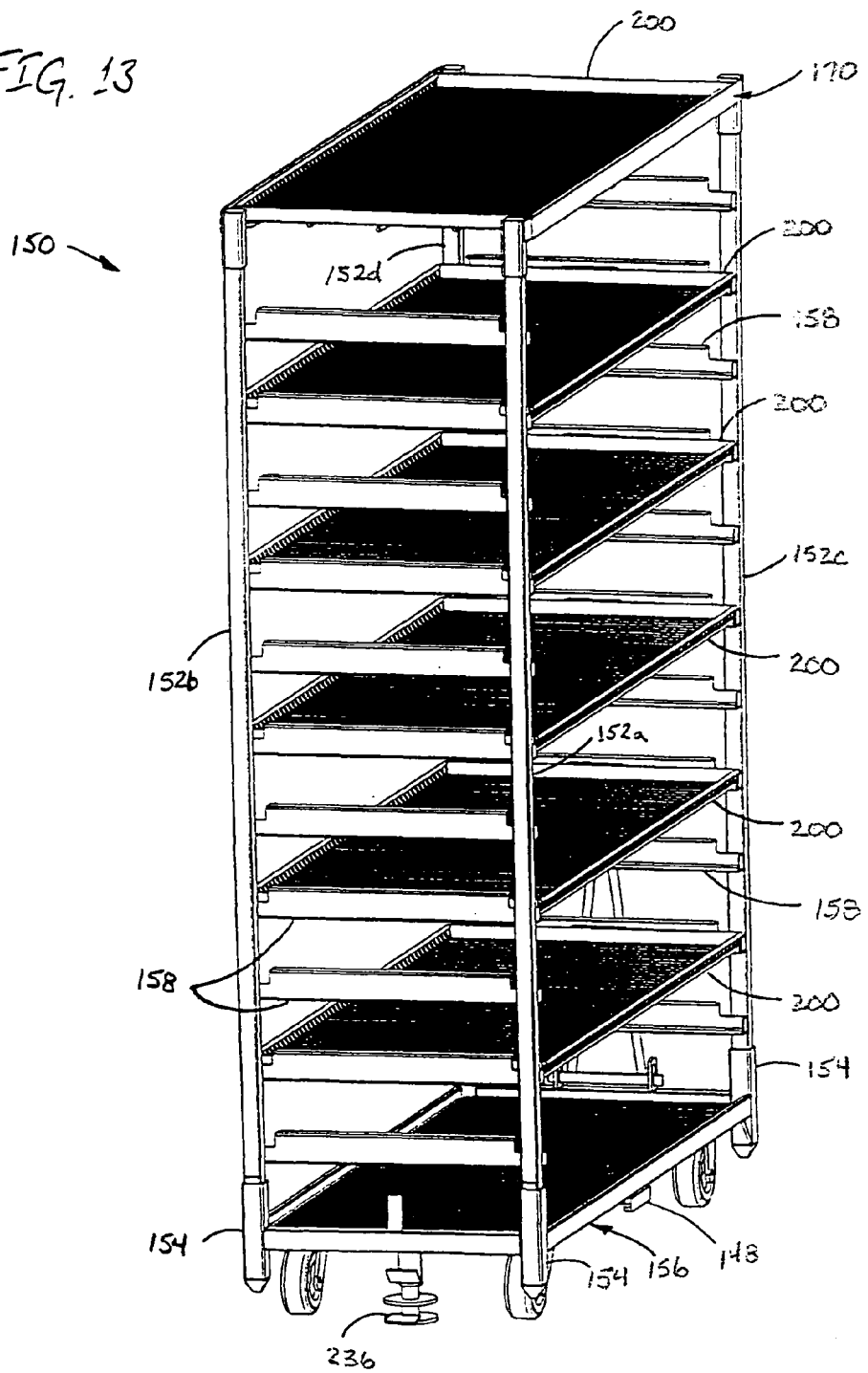

RACK FOR TRANSPORTATION AND DISPLAY OF PLANTS

RELATED APPLICATIONS

This application is a continuation-in-part application of abandoned U.S. non-provisional patent application Ser. No. 12/226,085, entitled "Rack for Transportation and Display of Plants", filed Oct. 21, 2008, which claims the benefit of U.S. provisional patent application Ser. No. 60/790,201, entitled "Transportation and Display Rack for Bedding Plants", filed Apr. 7, 2006.

BACKGROUND a. Field of the Invention

The present invention relates generally to racks for holding and displaying plants, and, more particularly, to a rack for potted plants having trays that retract to a compact form for transportation and that extend and tilt for display and accessibility of the plants at a retail location.

b. Related Art

Bedding plants (e.g., flowers, vegetables, herbs and so forth) are commonly placed on racks for transportation from the grower's facility to the store or other retail location. Conventionally, the racks comprise a wheeled frame or base having upright posts that support a series of vertically arranged shelves or trays. The carts are loaded with plants (usually in small plastic pots) at the grower's greenhouse or nursery, and then rolled into a truck/trailer for transportation. At the retail location, the racks are rolled out into the display area, where the plants can be viewed and selected by customers.

Plant transport carts therefore face conflicting design requirements that have not been adequately addressed by the prior art. On the one hand, from a shipping standpoint, it is desirable to pack as many plants as possible into a compact volume, which requires positioning the shelves as close together as possible, i.e., with minimum vertical spacing. At the retail location, on the other hand, it is important for the customers to be able to see and reach the individual plants, which is not possible with the shelves positioned closely atop one another. Moreover, the plants require watering and other care while on display, which may be a period of days or even weeks; however, with the shelves placed closely together it is difficult or even impossible to water or otherwise reach the innermost plants, at least without damaging those at the outer edges of the trays, so that the former are frequently neglected and become unsellable. However, spacing the racks farther apart reduces the number of plants that can be carried during transportation.

Certain prior attempts have been made to address these problems. Perhaps the simplest approach has been to provide shelves that are mountable at various heights along the posts, using a series of slots or other attachment points. Although this arrangement allows the trays to be spread apart vertically once the rack has been delivered to the retail store, it necessitates removing several of the trays to create the space between the others; storage of the removed trays then becomes problematic, and the plants thereon must be displayed separately from those in the rack. Other racks have utilized trays that are progressively smaller towards the top, in a manner of a series of steps, in an effort to make the inner plants easier to access; this approach provides only marginal benefit, and significantly reduces the number of plants that can be transported on a rack. Other racks have been configured to allow the trays to be tilted for easier viewing, but this alone does little to address the issues of spacing and efficient storage of the plants during transportation.

It is also essential from the retailer's standpoint that the racks be simple for store personnel to operate. Safety is also a significant factor, since the racks are very heavy, especially when fully loaded, and could cause injury to customers or store personnel if they were to topple over during use.

A concurrent requirement is that the racks must be comparatively economical to produce, since even a modestly-sized grower/supplier needs a great many racks, representing a significant capital expense. Moreover, the racks must be sturdy and durable, since they are subjected to very hard use during repeated trips between the grower/supplier and the retail stores.

Accordingly, there exists a need for a rack for transportation and display of bedding plants, that transports the plants in a compact mass with minimal vertical spacing between the trays, but that displays the plants in a vertically-spaced and accessible manner in a retail environment. Furthermore, there exists a need for such a rack that is simple and convenient to operate, particularly for use by retail store personnel. Still further, there exists a need for such a rack that can be economically manufactured, and that is durable and long-lasting in use. Still further, there exists a need for such a rack that is stable and safe when set up and displayed in a retail store environment.

SUMMARY OF THE INVENTION

The present invention has solved the problems cited above, and is a rack assembly for transportation and display of potted bedding plants and the like. Broadly, the rack assembly comprises: (a) a plurality of vertically extending supports, (b) a plurality of trays for holding the plants, (c) means for slidingly mounting the trays to the supports, so that the trays are selectively extensible from a retracted position in which the trays are arranged in compact, vertically-spaced relationship to a deployed position in which the trays extend on opposite sides of the supports in an alternating arrangement and with increased vertical spacing, and (d) means for tilting the trays in the deployed position, to a downwardly angled orientation in which the trays are readily accessible by customers and other personnel.

The supports may be mounted on a mobile frame that allows movement of the rack assembly. The mobile frame may comprise a plurality of caster wheels that support the frame for rolling movement.

The means for tilting the trays in the deployed position may comprise means for tilting all of the trays simultaneously.

The plurality of supports may comprise a plurality of post members having attachment features that form a sliding engagement with the trays. The attachment features may comprise a plurality of pin members at vertically-spaced locations. The trays may comprise guide channels that receive the pin members in sliding engagement. The assembly may comprise stationary support posts mounted in paired relationship at ends of the assembly. The guide channels may be mounted along lateral edges of the trays for receiving the pin members on the stationary posts at the ends of the assembly, so as to hold the trays in a generally horizontal orientation when in the retracted position.

The means for simultaneously tilting the trays when in the deployed position may comprise first and second vertically adjustable members that interconnect the rearward edges of the trays when the trays are extended to the sides of the assembly. The at least one vertically adjustable member may be operatively connected to the rearward edges of the trays so as to raise the rearward ends of the trays to an inclined angle when the adjustable members is lifted. The assembly may further comprise means for pivotally mounting edge portions of the trays to the stationary posts, so that the forward edges of the trays pivot downwardly as the rearward edges are raised.

The at least one vertically adjustable member may comprise first and second adjustable posts mounted for vertical sliding movement intermediate the pairs of stationary support posts at the ends of the assembly. The adjustable posts may comprise a plurality of vertically-spaced pin members that are received in the guide channels on the trays in sliding engagement therewith, so that when the trays are extended the pin members on the adjustable posts are positioned proximate the rearward edges of the trays and the pin members on the stationary support posts are positioned proximate the middle portion of the trays so as to form a pivot connection therewith, so that the trays pivot to the inclined orientation in response to the adjustable posts being lifted. The adjustable posts may be received for sliding vertical movement in stationary sleeves that are mounted intermediate each pair of stationary posts.

The assembly may further comprise means for locking the trays in the compact, retracted position, for transportation of the rack assembly between locations. The means for locking the trays in the retracted position may comprise first and second vertically-extending slots formed in edges of the trays, that receive the pin members of the adjustable support posts in locking engagement when the trays are in the retracted position. The means for locking the trays in the retracted position may further comprise means for locking the adjustable support posts in a raised position in which the pin members thereon are received in and engage the slots on the edges of the trays. The means for locking the adjustable support posts in the raised position may comprise a locking pin for being selectively passed through cooperating bores in at least one of the adjustable posts and the stationary sleeve through which the post extends.

The assembly may further comprise means for locking the trays in the deployed position in which the trays extend alternatingly on the sides of the assembly. The means for locking the trays in the deployed position may comprise the slots in the edges of the trays, that engage the pin members on the pairs of stationary support posts when the trays are in the extended position.

The assembly may further comprise means for locking the trays in the downwardly angled orientation when deployed. The means for locking the trays in the downwardly angled orientation may comprise means for locking the vertically adjustable posts in an elevated position. The means for locking the posts in the elevated position may comprise a bore formed in at least one of the adjustable support posts that moves into register with a bore in the sleeve through which the post passes as the post is raised to the elevated position, and a locking pin for being passed through the bore when aligned.

In another embodiment the means for slidingly mounting the trays to the supports so that the trays are selectively extensible may comprise horizontal, inwardly facing guide channels that are mounted to the supports, and projections at side edges of the trays that are received in runs of the guide channels for horizontal sliding movement therein. The means for tilting the trays in the deployed position may comprise a pair of projections located proximate a rearward edge of each of said trays, and secondary, raised runs in said guide channels, into which said projections at said rearward edges of said trays are lifted so as to incline said trays to said downwardly angled orientation.

The channel members may comprise flange portions that project inwardly proximate middle areas of said channel members so as to define said upper and lower runs thereof. The means for tilting the trays in the deployed position may further comprise a pair of pivot projections at sides of said trays that engage said lower runs of said guide channels at locations intermediate front and rear edges of said trays, so as to support middle portions of said trays while said projections at said rearward edges of said trays are received in said upper runs of said guide channels. The pivot projections may comprise rod ends that project laterally from sides of the trays, and the guide channels may further comprise stop walls formed at outer ends of said lower runs, that contact said pivot projections on said trays so as to prevent said trays from sliding out of said assembly when in said downwardly angled orientation. The guide channels may further comprise layers of low friction material that are mounted in said lower runs of said guide channels.

The rack assembly may further comprise at least one stabilizer assembly that prevents tipping of the rack assembly when the trays are in the deployed position. The stabilizer assembly may comprise a tube member that is mounted to the mobile frame, first and second shaft members that are received in the tube member so as to be selectively extensible on opposite sides of the frame, and first and second stabilizer legs mounted on outer ends of the shaft members that are selectively rotatable to be positioned proximate a ground surface when the shaft members are extended on opposite sides of the frame.

The support posts may comprise vertically elongate, post members, and the mobile base may comprise a plurality of vertically extending sockets for receiving the posts therein. The pin members on the support posts each comprise a head portion that is captured in the guide channel on a tray, and a shank portion that extends through a slot opening in the guide channel. The head portion may be a generally cylindrical member having a relatively larger diameter, and the shank portion may be a generally cylindrical member having a relatively smaller diameter.

These and other features and advantages of the invention will be more fully understood from a reading of the following detailed description with references to the accompanying drawings.

BRIEF DESCRIPTION OF THE DRAWINGS

FIG. 5 is a second, end elevational view of the transportation and display rack, similar to FIG. 4, showing the manner in which the multiple trays can be tilted to their display position simultaneously by pressing downwardly on the outer lip of a single one of the trays;

FIG. 6 is a perspective view of one of the trays of the transportation and display rack of FIGS. 1-5;

FIG. 7 is a partial end view of the tray of FIG. 6, showing the configuration of the guide channel thereof in greater detail and the manner in which the guide channel engages cooperating pins on the vertical posts of the rack assembly;

FIG. 8 is a partial, perspective view of the edge of the tray of FIGS. 6-7 and the cooperating pin, showing the manner in which the pin is received in a vertical slot in the edge of the tray to lock the tray in the horizontal, stowed position that is shown in FIG. 1, and also the manner in which a locking pin is passed through cooperating bores in the vertical post and adjustable tray support bracket to hold the trays in this position;

FIG. 10 is a an elevational view of one of the side edges of the tray of FIG. 9, showing the ramped configuration of the depending upper lip of the guide channel;

FIG. 11 is a partial, perspective view of the edge of the tray of FIG. 9, similar to FIG. 8, showing the manner in which the pin is received in a vertical slot in the edge of the tray to lock it in the horizontal, stowed position;

FIG. 12 is a partial, perspective view, similar to FIG. 9, showing the manner in which the pin passes through cooperating bores in the adjustable tray support and a stationary sleeve when the former is in the raised position, so as to lock the trays in the downwardly angled orientation that is shown in FIG. 3;

FIG. 13 is a perspective view of a plant transportation and display rack in accordance with a second embodiment of the present invention, showing the rack in its retracted configuration;

DETAILED DESCRIPTION

Figure 1:
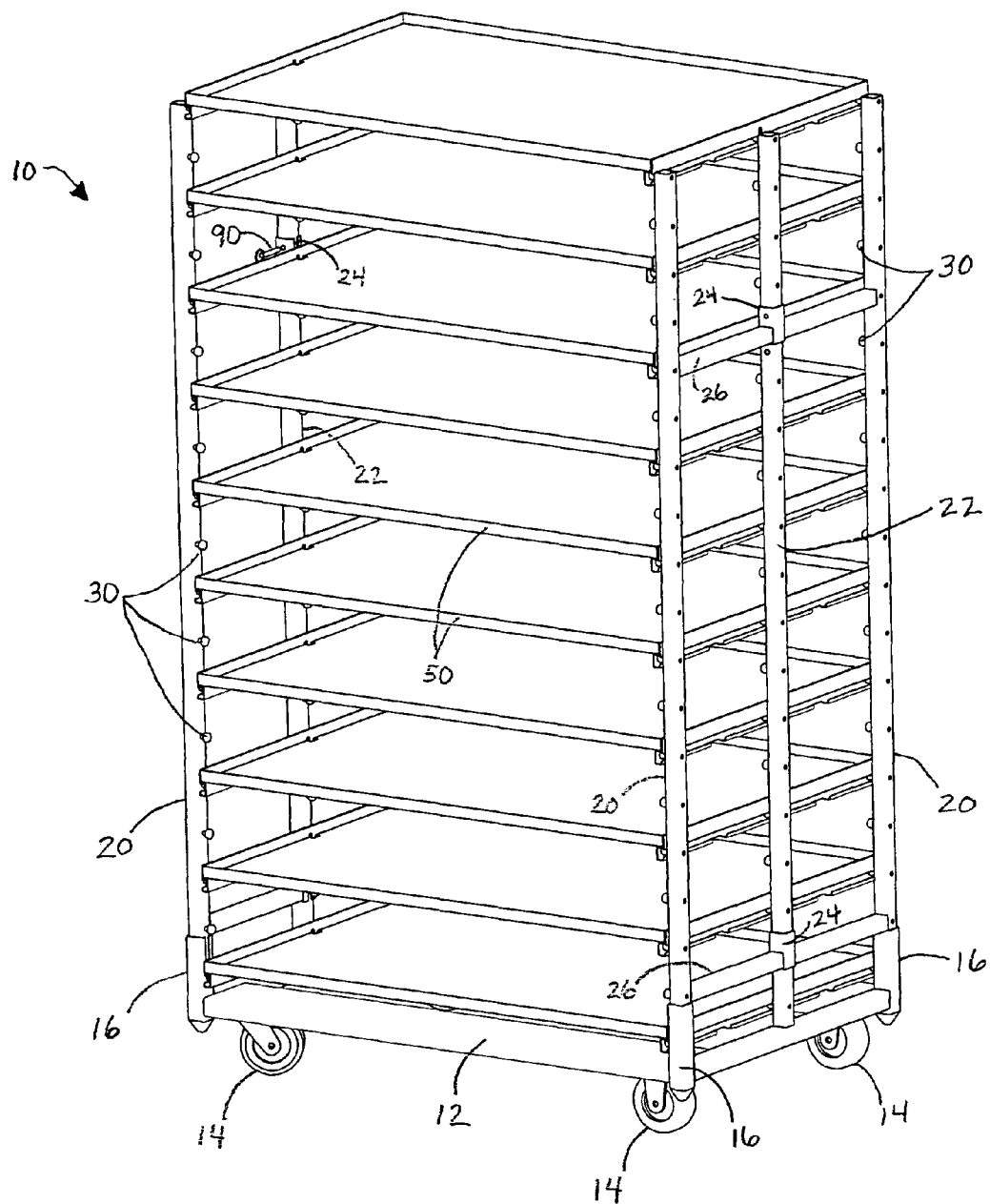
FIG. 1 is a perspective view of a plant transportation and display rack in accordance with the present invention, showing the rack in its retracted configuration with the trays thereof in a compact closely-spaced vertical relationship for transportation.

FIG. 1 shows a plant transportation and storage rack assembly 10 in accordance with the present invention. As can be seen, the assembly includes a rectangular base frame 12 that is supported for rolling movement by casters 14. The frame includes vertically-aligned sockets 16 at each of its four corners (three only being visible in FIG. 1), which are suitably formed of square-section metal tubing welded to the rails/cross-members of the base frame.

The sockets 16 each receive a vertical stanchion or post members 18 in removable, sliding engagement therewith, the post members suitably being formed of square-section metal tubing dimensioned to fit closely within the sockets. The post members are each substantially identical in construction so that they fit interchangeably within the sockets 16, thereby facilitating knock-down and reassembly of the rack.

The stationary post members 20 are mounted in parallel, spaced-apart pairs at each end of the rack assembly. A third, movable, vertically adjustable post member 22 is mounted between each pair of stationary post members 20, in spaced, parallel relationship therewith. The center post members 22 extend through stationary collars or sleeves 24 at vertically-spaced locations, so as to be supported for vertically sliding, reciprocating movement therein. The sleeves 24 are suitably formed of square-section metal tubing sized to cooperate with the moving post members, and are supported on cross-members 26 that extend from and are mounted to the stationary post members 20.

The stationary and moving post members each include a plurality of projecting pin members 30 at regular, vertically-spaced intervals (e.g., at four-inch spacings). As can be seen in FIG. 7, each of the pin members has a "mushroom" configuration, with an enlarged head portion 32 that is supported at a spaced distance from the side 34 of the post member by a smaller diameter, horizontal shank portion 36, so that a shoulder or step 38 is formed at a junction between the head and shank portions. In the illustrated embodiment, the pin members are formed with cylindrical head and shank portions, which provides a horizontal axis support that can function as a pivot as well, and also allows for economical fabrication using conventional large-diameter rivets for the pin members; it will be understood, however, that the shape of the pin members is somewhat arbitrary and that other shapes and configurations may be used as long as they cooperate with the trays to provide the support and pivot functions; moreover, other forms of attachment features that form a sliding engagement with the trays may be used. As with the other components, the pin members are suitably formed of metal, although various polymeric materials may also be suitable.

The pin members 30 support a plurality of tray members 50. As can be seen in FIG. 6 and also FIG. 7, the tray members 50 each include a main panel 52 that is bordered by first and second side walls 54 and front and rear edge walls 56. Again, it will be understood that the panel and border portions may have various other configurations suitable for supporting potted plants, e.g., the panel portion may be formed of expanded metal or wire rather than being a continuous sheet as shown.

First and second guide channels 60 are mounted beneath the side edges of the panel. As can be seen in FIG. 6 and also FIG. 7, the guide channels are semi-enclosed, having an outwardly facing slot opening 62 and a C-shaped configuration defined by an inner wall 64 and upper and lower walls 66, 69 having depending and raised lip portions 70, 72. In the embodiment illustrated in FIGS. 6-7, the depending lip portion 70 is formed by a depending edge of the side wall 54 of the tray member.

As can be seen in FIG. 7, the C-shaped guide channels 60 thus capture the pin members 30 for sliding movement, with the top walls 66 of the channels riding atop the upper surfaces 40 of the pin members, and lateral shifting movement being prevented in one direction by abutment of the depending lip 70 against the step 38, and in the other direction by abutment of the wall 64 against the head of the pin member. The tray members 50 are thus held against vertical and side-to-side movement, while the guide channels permit the tray members to slide on the pin members in a front-to-rear direction. As is shown in the figures, the interior dimensions of the guide channels 60 are sized slightly larger than the cooperating portions of the pin members, so as to form small vertical and side-to-side gaps that prevent binding and accommodate minor misalignments due to damage/wear.

Thus, in order to install a tray in the rack assembly, the open ends of the two channels 60 are positioned in alignment with a selected set of pin members, and the tray is then slid into the rack assembly in a horizontal direction. Optionally, as is shown in FIG. 6, cutout openings 74 may be provided in the bottom walls 69 of the channel members, to permit the trays to be set down onto the pins and then slid into place.

As can be seen with further reference to FIG. 6, the two side walls 54 of the tray member each include a short, vertically extending slot 76 that extends upwardly from each of the guide channels 60. The slots 76 are formed proximate the lengthwise midpoints of the side walls, and are sized to receive the shank portions 36 of the pin members; cutout openings 78 (one only being visible in FIG. 6) are formed in the panel 52 just inboard of the slots 76, and are in turn sized to accommodate the head portions 32 of the pin members.

Figure 2:
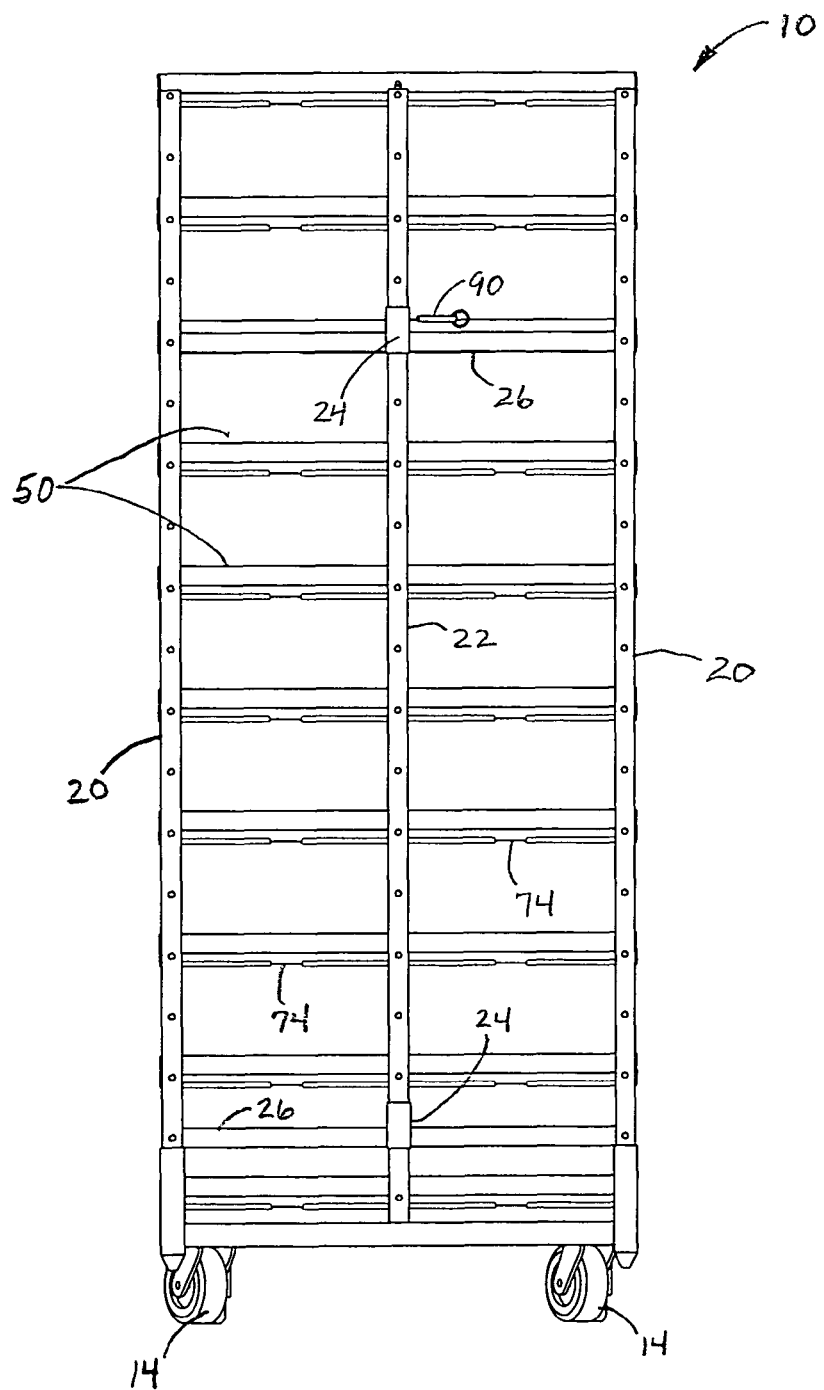
FIG. 2 is an end, elevational view of the transportation and display rack of FIG. 1, showing the relationship of the posts and trays in the retracted configuration in greater detail.

Consequently, as is shown in FIG. 8, when the tray members are centered in the rack assembly, relative to the movable post members 22, the slots and openings 78 align vertically with the pin members 30, so that the tray members drop down into locking engagement therewith. The tray members are thus held firmly within the compact, stowed position that is shown in FIGS. 1-2, during movement of the rack assembly or as otherwise desired. In order to secure the trays even more firmly in place (e.g., for transportation over long distances and/or over bumpy roads), the movable posts 22 are raised slightly (e.g., ¾ inch), in the direction indicated by arrow 80 in FIG. 8, thus drawing the shank portions of the pin members further up into the slot openings 76, in the direction indicated by arrow 82. As this is done, the vertical posts 22 slide vertically through the collars 24, moving a hole 84 in the post into register with a cooperating hole 86 in the sleeve, at which point the shaft 88 of a locking pin 90 is passed through the holes to lock the movable post members in the slightly raised position.

Figure 9:
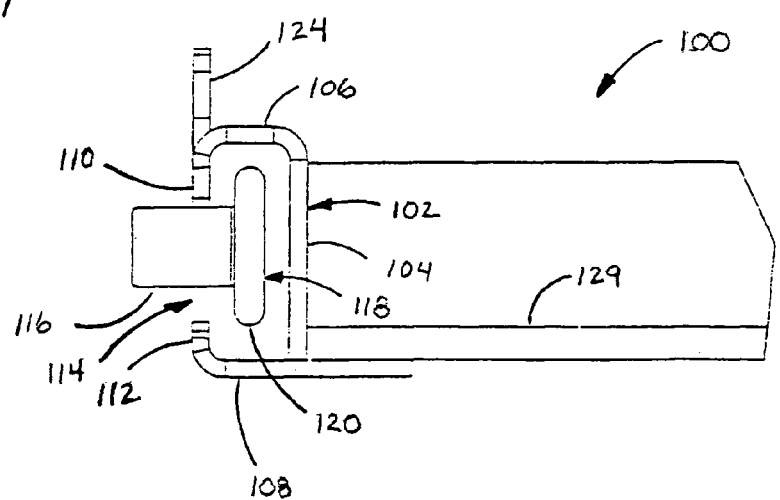
FIG. 9 is a partial end view, similar to FIG. 7, of a second form of tray in which the guide channel is formed along and outwardly of the edges of the tray rather than beneath them.

FIG. 9 shows a tray member 100 in accordance with another embodiment of the invention, having guide channels 102 mounted along its lateral edges, rather than beneath them as in the embodiment that is illustrated in FIGS. 6-8; this arrangement has certain advantages in terms of economy of construction, as well as spacing the plants away from the vertical posts (by the width of the guide channels), so as to reduce the possibility of the plants being damaged by brushing against the posts and/or projecting pin members. The guide channel 102 similarly includes a vertical inner wall 104, that in this instance forms the side wall of the tray area itself. Upper and lower wall portions 106, 108 extend generally horizontally from the upper and lower edges of the inner wall portion 104, and have depending and raised lip portions 110, 112 that complete the C-shaped configuration. The openings 114 of the guide channels receive the shank portions 116 of the pin members 118 so as to allow sliding movement of the tray members in a generally horizontal direction, with the heads 120 of the pin members being captured by the depending/raised lip portions 110, 112 in the manner described above.

As can be seen in FIGS. 10-11, the depending upper lip 110 of each guide channel includes a vertically extending locking slot 122 that is located centrally in the lateral edge of the tray member, similar to the locking slot 76 described above. The locking slot 122 is formed within a tab or flange portion 124 that is punched out of the upper wall 106 of the guide channel and bent vertically to provide sufficient height for the slot. The punched out opening 126 (see FIG. 11) in turn accommodates the head portion 120 of the pin member, similar to openings 78 described above.

As can be seen with further reference to FIG. 10, it can be seen that the depending upper lip 110 of the guide channel includes downwardly sloped or ramped portions 128a, 128b that extend for several inches to the sides of the locking slot 122, so that the height of the lip portion increases progressively towards the locking slot. The ramp portions 128a, 128b cooperate with the upper side of the shank portion 116 of the pin member, causing the tray to rise slightly as the locking slot is pushed towards the pin member. This rising effect and also the resulting slight increase in resistance provides the operator with a cue that the locking slots are approaching the pin members, thus facilitating rapid and convenient use of the assembly by both nursery and store personnel.

FIG. 11 also shows the use of a wire grate 129 for the bottom of the tray member, rather than a continuous panel as described above.

As was described above, the locking notches of the trays engage the pin members of the central, movable posts 22 to lock the trays in their retracted positions. The outer (front and rear) edges of the trays are in turn supported by the pin members on the outer, stationary posts 20, so that the trays are held in a compact, vertically stacked configuration as shown in FIGS. 1-2.

In use, the operator at the nursery or other supply facility can simply load each tray and then position the guide tracks at its edges over a set of pins on the posts and slide it horizontally into position in the rack assembly. The rack assembly can thus be quickly and conveniently loaded at the facility, with the plants being packed very tightly for transportation. Moreover, the vertical spacing between the trays (e.g., 4 inches, 8 inches, etc.) can be adjusted for different heights of plants by selecting sets of pin members at different heights. The trays can then be locked in position by raising the movable posts 22, as described above.

Figure 3:
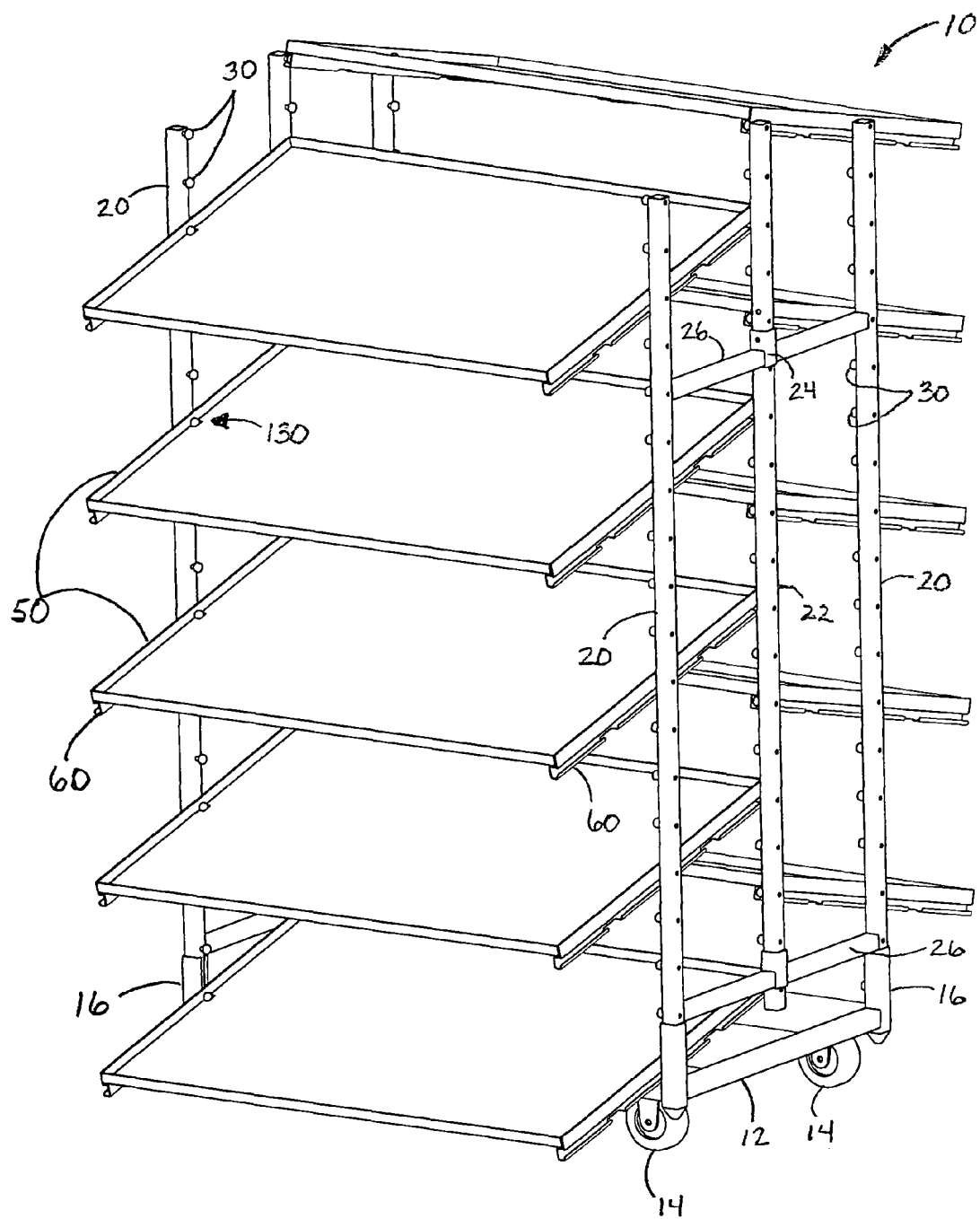
FIG. 3 is a second perspective view of the transportation and display rack of FIGS. 1-2, showing the rack with the trays extended at vertically-spaced locations and tilted for display/care of the plants thereon.

After the rack assembly has been delivered to a retail store or similar facility, the movable posts (if previously raised) are dropped by removing the locking pin from the sleeve 24. The trays are then lifted slightly to remove the pin members of the central posts 22 from the locking slots, and then drawn outwardly to the sides of the rack assembly on an alternating basis, as shown in FIG. 3. As this is done, each of the trays in a succession drops into a second locked, extended position when the pin members 30 of the outer, fixed posts come into alignment with the locking notches, as indicated at 130 in FIG. 3.

Figure 4:
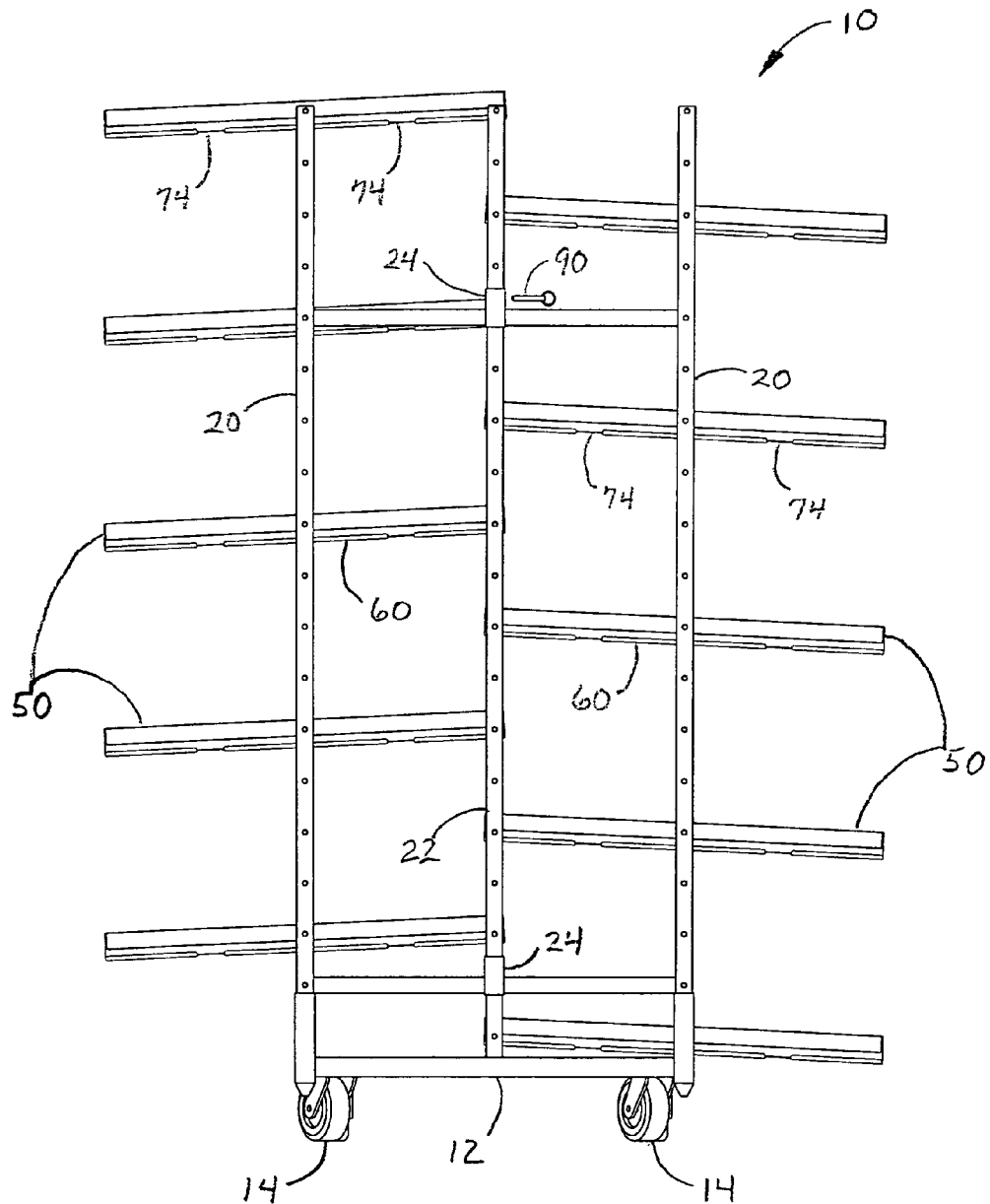
FIG. 4 is an end, elevational view of the transportation and display rack of FIGS. 1-3, showing the trays thereof as they are initially extended on alternating sides of the rack.

The trays thus assume a staggered configuration as shown in FIG. 4, with an equal number preferably extending on both sides of the rack assembly (e.g., five trays on each side of the assembly that is illustrated in FIG. 4). The weight of the trays and plants is thus evenly distributed, avoiding any tendency for the assembly to tip one way or the other.

It will be observed in FIG. 4 that, when the trays are in their extended positions, the pin members of the central, movable posts 22 remain in engagement with the rearward ends of the guide channels 60. Thus, pressing downwardly on the outer edge of one of the extended tray members, as indicated by arrow 132 in FIG. 5, causes the tray to pivot about the pin members on the stationary posts 20, raising the opposite, rearward edge of the tray member to rise a corresponding amount. Since the pin members of the movable posts 22 are located in the guide channels at the rearward edges of the tray members, the movable posts are likewise lifted, in the direction indicated by arrow 134. In so doing, the posts 22 draw the rearward edges of the other trays upwardly, pivoting them to the same angle as that to which the first tray member has been depressed.

The operator is thus able to pivot all of the tray members to the same downwardly-sloping angle, by simply pressing with one hand against the outer edge of a single one of the tray members. As the tray members reach a predetermined angle suitable for display of the plants thereon (suitably, about 15°), the posts 22 rise to the point where a hole 136 in the wall of one of the posts moves into register with a cooperating hole 138 in the stationary sleeve 24; the shank 88 of the pin 90 is then passed through the holes to lock the post members in the raised position, supporting the trays in their angled orientations as shown in FIG. 5. It will also be noted in FIG. 12 that the guide sleeves 24 include vertically extending through the slots 140 formed in their inwardly facing walls, to accommodate passage of the shank portions of the pin members as the posts 22 are raised/lowered therethrough.

When the rack assembly is locked firmly in the deployed configuration, as shown in FIGS. 3 and 5, the trays are angled so that the plants thereon are easily seen, and the doubled vertical spacing (as compared to the compact configuration for transportation) ensures that the plants are easily reached, either by customers or by store personnel performing watering or other care. Moreover, because (as noted above) the trays extend alternately on both sides of the assembly, weight is evenly distributed and there is a reduced possibility of the rack assembly tipping over during use; in order to further reduce the chance of tipping, the frame 12 may be provided with additional stabilizing legs or struts (not shown) that extend out beneath the lowermost trays and engage the floor on the sides of the assembly.

When the plants have been sold or it is otherwise time to return the rack assembly to the supplier's facility, the steps described above are reversed, i.e., the movable posts 22 are dropped back down so that the trays assume a horizontal orientation and the outer edges of the trays are lifted slightly to disengage their locking slots from the outer sets of pin members. The trays are then slid horizontally until the locking slots drop onto the pin members of the central posts 22 and lock the trays in the compacted configuration (FIG. 1) for transportation.

As was noted above, the rack assembly is suitably constructed of metal (e.g., steel (preferably galvanized) or aluminum alloy, although high strength plastics, fiberglass or similar materials may also be used for all or part of the assembly. The rack assembly is therefore durable and long-lasting, even when subjected to hard use and many cycles of transportation between the supplier facility and retail stores. Moreover, the materials and parts are economically sourced and assembled, and the use of interchangeable components for the posts and trays enables these to be replaced individually in the event of damage, as well as facilitating knockdown and reassembly, especially in situations where a facility is using or storing multiple units.

The rack assemblies are preferably constructed with base dimensions that divide equally into the dimensions of standardized cargo truck or trailer boxes, so that use of the vehicle capacity can be maximized each trip.

FIGS. 13-19 show a plant transportation and storage rack assembly in accordance with another embodiment of the present invention, that is somewhat simplified from the embodiment shown in FIGS. 1-12. A principle difference is the elimination of the vertically movable center posts, which significantly reduces the cost and weight of the assembly, albeit at the expense of not being able to tilt all of the trays simultaneously.

Accordingly, as can be seen in FIG. 13, the simplified rack assembly 150 includes four stationary, upright post members 152a-d having lower ends that are received in upperly facing, sleeve-shaped corner sockets 154 of a wheeled cart base 156. The cart base may suitably be of an industry standard size and type, further enhancing the economy of the assembly and also enabling the rack system to be used with existing carts. However, the cart base may also be constructed to incorporate improvements in accordance with the present invention, as will be described in greater detail below.

Figure 15:
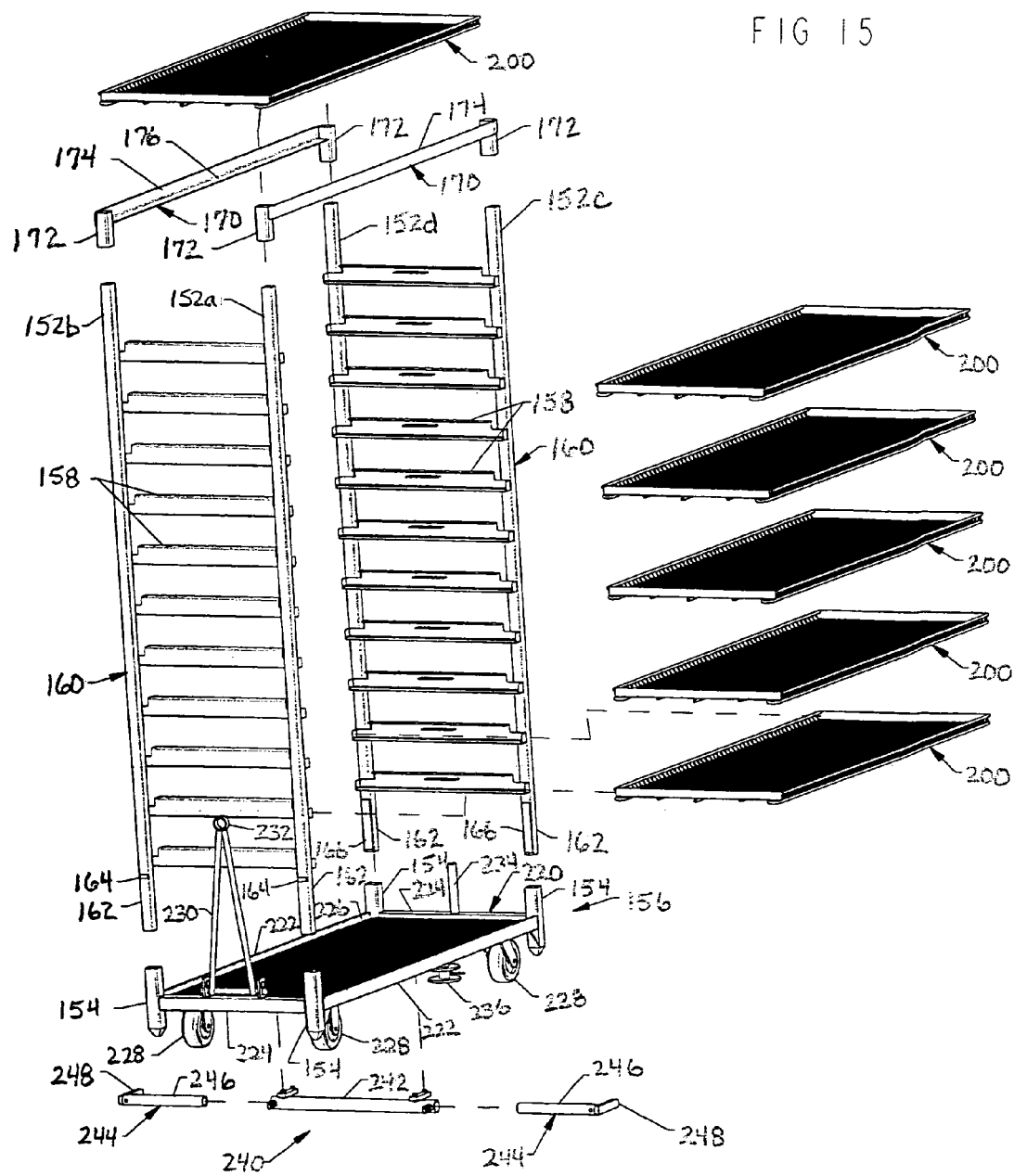
FIG. 15 is a perspective, exploded view of the plant transportation and display rack of FIGS. 13-14, showing the relationship of the components thereof in greater detail.

As can be seen in the exploded view of FIG. 15, the upright posts or stanchions are mounted together in pairs 152a-b and 152c-d, being joined together by a series of horizontal, vertically spaced guide tracks 158. The guide tracks are mounted (e.g., welded) to the vertical posts in a manner similar to a series of ladder rungs, thus forming first and second rigid, identical support assemblies 160. The lower ends 162 of the vertical posts are provided with protruding stops 164 that limit their insertion into the sleeves that form sockets 154, and raised pads 166 that press against and form a frictional engagement with the inside surfaces of the sleeves to prevent accidental dislodgement of the supports during use.

The upright support assemblies 160 are thus mounted transversely across the two ends of the wheeled car. The upper ends of the supports are in turn joined together longitudinally by bridge pieces 170. The bridge pieces each include having downwardly-opening sleeve-shaped sockets 172 that fit over the upper ends of the posts, and horizontal, longitudinally extending bar portions 174. As can be seen, the longitudinal bars are suitably formed of metal angle stock, welded to the sleeves 172, with the inwardly extending wall 176 of the angle stock forming a shelf on which one of the tray units can be placed at the top of the assembly, as will be described in greater detail below.

Figure 16:
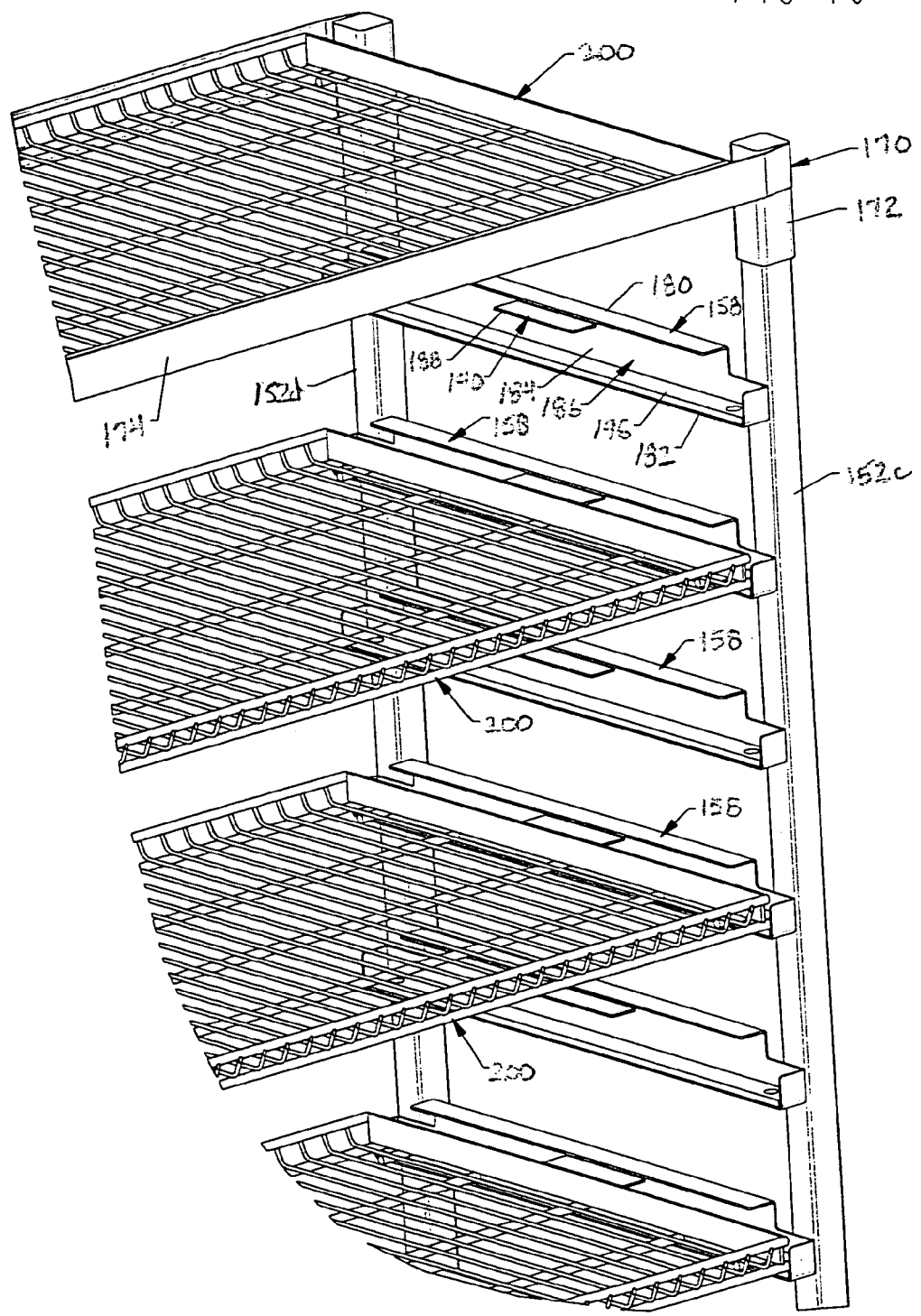
FIGS. 16 and 17 are partial perspective views of the transportation and display rack of FIGS. 13-15, showing the cooperation of the sliding trays with the stationary components thereof in the retracted and deployed configurations in greater detail.
Figure 17:
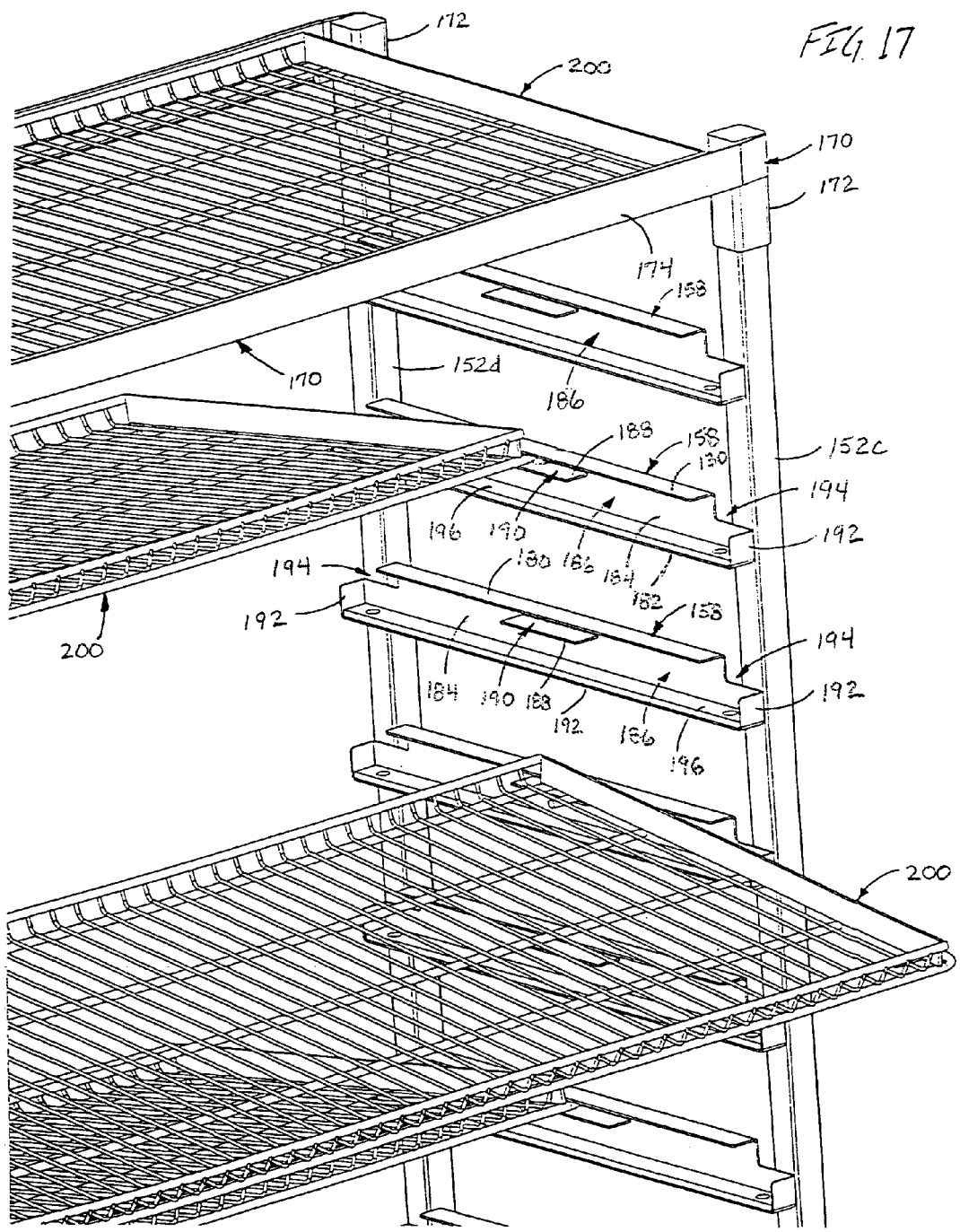

As can be better seen in FIGS. 16-17, each of the guide channels 158 has a generally U-shaped cross section, with upper and lower horizontal flange portions 180, 182 and a vertically extending web portion 184 that define an inwardly facing main channel 186. A short intermediate flange portion 188 projects horizontally from the web a short distance below and parallel to the upper flange portion 158 so as to define an upper, somewhat narrower secondary channel 190. The intermediate flange portion and secondary channel are confined to the middle portion of the guide track 158, i.e., proximate to the midpoint between the upright post 152a-b/152c-d. Walls extend upwardly from bottom flange 182 to form stops 192 at the ends of the main channels 186, with an opening 194 being formed between the stops 192 and the upper flange portions 180. A low-friction glide strip is mounted (e.g., riveted) atop the bottom flange 182, and is suitably formed of UHMWPE or other durable material having a low coefficient of friction.

Figure 14:
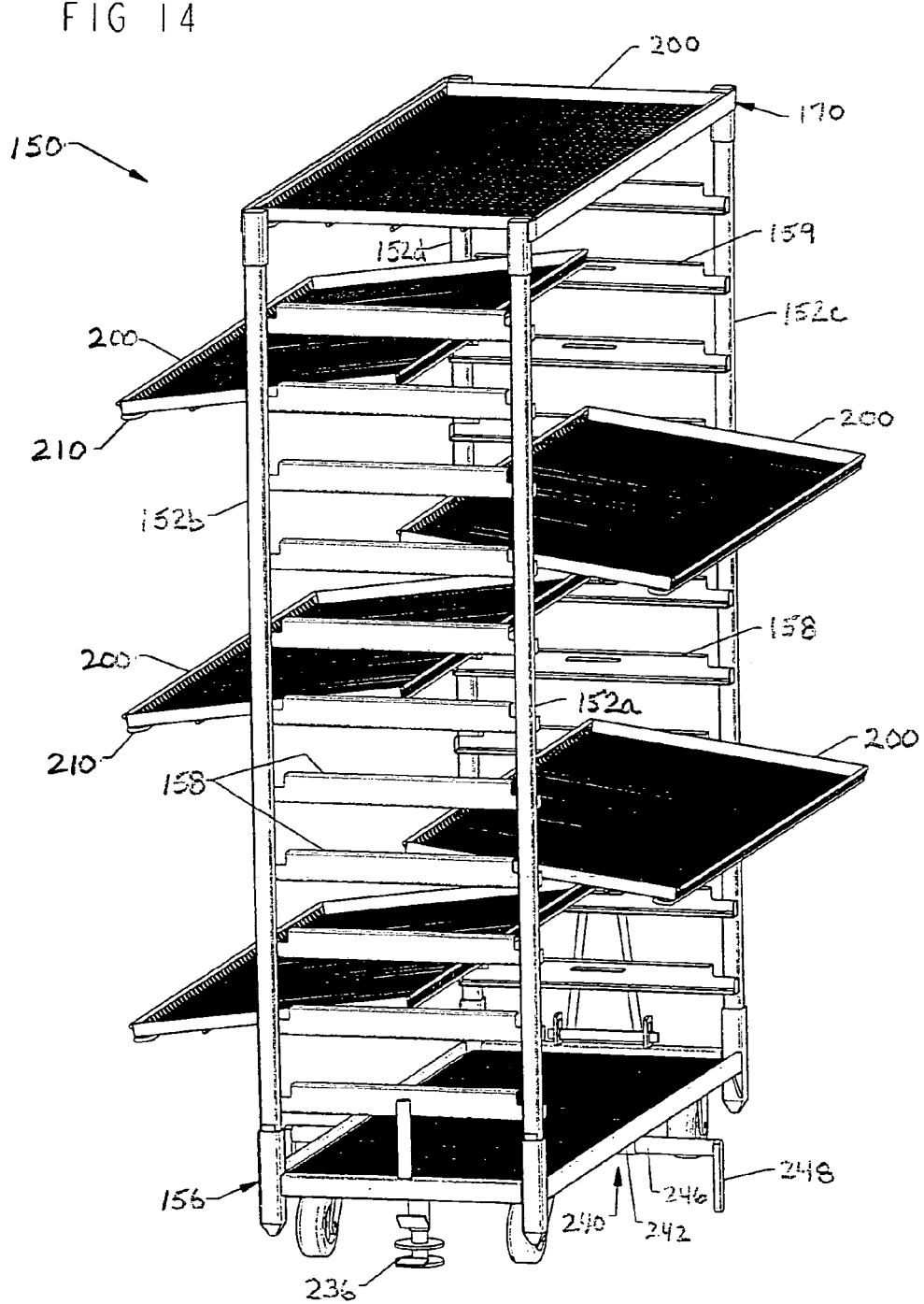
FIG. 14 is a second perspective view of the plant transportation and display rack of FIG. 13, showing the rack in its deployed configuration, with the trays thereof extended to the sides and on an alternating basis and tilted to the display position.
Figure 18:
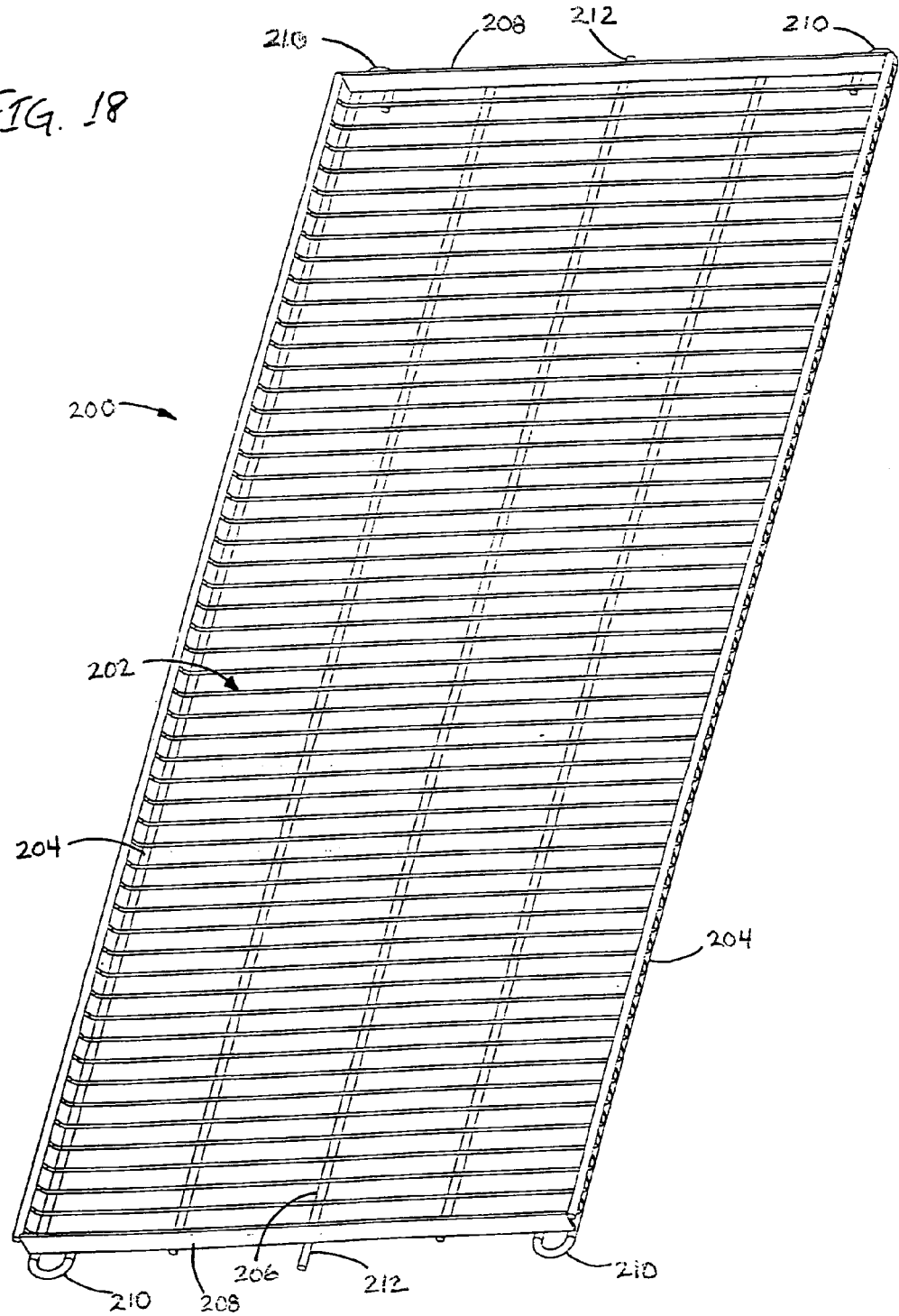
FIG. 18 is a perspective view of one of the sliding trays of the transportation and display rack of FIGS. 13-15, showing the configuration thereof in greater detail.

As can be seen is FIGS. 15-17, and also FIGS. 13-14, the guide tracks support the tray units 200 of the rack assembly. Referring to FIG. 18, each of the tray units is identical, and includes a wire rack 202 formed of longitudinal and traverse bars mounted. The longitudinal bars at the bottom of the rack lie in a common plane, with the outer ends of the side bars 204 and center bar 206 protruding beyond the end walls 208 of the tray unit. The ends 210 of the side bars 204 are preferably bent back upon themselves to form rounded, U-shaped supports, as shown in FIG. 18, that increase the bearing surfaces that contact the channels of the guide brackets; the U-shaped ends 210 are also preferably polished and/or provided with a low-friction coating to cooperate with the low-friction glide strips to allow the tray units to slide through the guide brackets smoothly and with minimal effort. The ends 212 of the center bar are suitably left straight, as shown in FIG. 18, since these act primarily as stops against the end walls 192 of the tracks. It will be understood that the tray units may also be formed with solid panels rather than using the wire rack construction that is shown.

To install the tray units in the assembled supports, each unit is aligned with a pair of guide brackets a selected level, and the protruding rod ends 210, 212 are then inserted through the openings 194 so that the former drop onto and are supported by the lower flange portions 182 in the lower runs of the guide brackets, in contact with the glide strips 196.

When the tray units are fully inserted into the guide brackets, they rest horizontally in the retracted configuration, as shown in FIGS. 13 and 16. In this configuration, the outer bar ends 210 react against the stops 192 of the guide brackets to hold the trays securely against side-to-side movement during transportation, while the intermediate flanges 188 of the guide brackets are located above the central rod ends 212 to prevent movement in a vertical direction.

In order to extend and tilt the tray units to their deployed configuration, the operator first grasps and raises the selected edge of each tray unit and lifts the associated bar end 210 over the stop wall 192. The operator then presses downwardly on the outer edge of the tray unit, to raise the opposite rod ends 210 until they contact the upper flanges 180 of the guide brackets, and then up pulls outwardly on the tray until the central rod ends 212 contact the stop walls 192 so as to arrest outward motion. As this is done, the rod ends 210 on the inboard edge enter the upper, secondary runs or channels 190 in the guide brackets, so that they rest atop the intermediate flange portions 188 and therefore hold the tray units at the downwardly tilted angle when released by the operator. When in use, the tray units will normally be deployed on alternating sides, as shown in FIG. 14, however, they may also be deployed on the same side if desired, e.g., for cleaning.

To return the tray units to the retracted configuration, the operator simply presses against their outboard edges so as to slide the tray units inwardly, until the rod ends 210 on the inboard edges drop off of the intermediate flange portions 188 and fall back onto the lower flange portions 182. The rod ends 210 at the outboard edges are then lifted over the stop walls 192, and the units slid home to their original, horizontal positions. The illustrated construction, in which the guide channels are mounted on the support posts and the projections are formed at the sides of the tray members, is generally preferred for reasons of cost and durability, however, it will be understood that the relationship may be reversed, similar to the first embodiment described above.

As noted above, the wheeled cart on which the supports and trays are mounted may be a conventional "off the shelf" type cart, or may be an improved type of cart incorporating features provided by the present invention. In the illustrated embodiment, the cart 156 includes a frame 220 that is formed by longitudinal side rails 222 and transverse end rails 224, mounted to the vertical receiver sleeves 154 at the corners of the rail. A rectangular screen panel 226 is mounted in the space between the frame bars, and caster wheels 228 are mounted to the bottom of the frame proximate the corners thereof. A tow bar 230 is pivotally mounted to the frame bar 224 at one end of the cart, so that it can be lowered from a vertical, stored position to a horizontal, deployed position. The tow bar includes a collar 232 (suitably formed of a short section of pipe) at is distal end, which is sized to slip over a cooperating hitch post 234 at the opposite end of the cart, so that a plurality of the carts can be hitched together to form a "train" that can be pulled through a greenhouse or other facility.

A drop-down brake pad 236 is mounted beneath the frame to hold the assembly in place when desired. In addition, a stabilizer assembly 240 is included to prevent lateral tipping motion, particularly when the trays are in the extended positions. As can be seen in FIG. 15, the stabilizer assembly includes a main tube 242 (suitably formed of a length of pipe) that is mounted to the side rails of the frame so as to extend transversely across the bottom of the cart, and first and second pivoting stabilizer member 244; each of the stabilizer members has a tubular shaft 246 that is pivotally received in the stationary cross tube 242, and a leg portion 248 that is mounted to the distal end of the shaft and extends at a right angle thereto.

Figure 19:
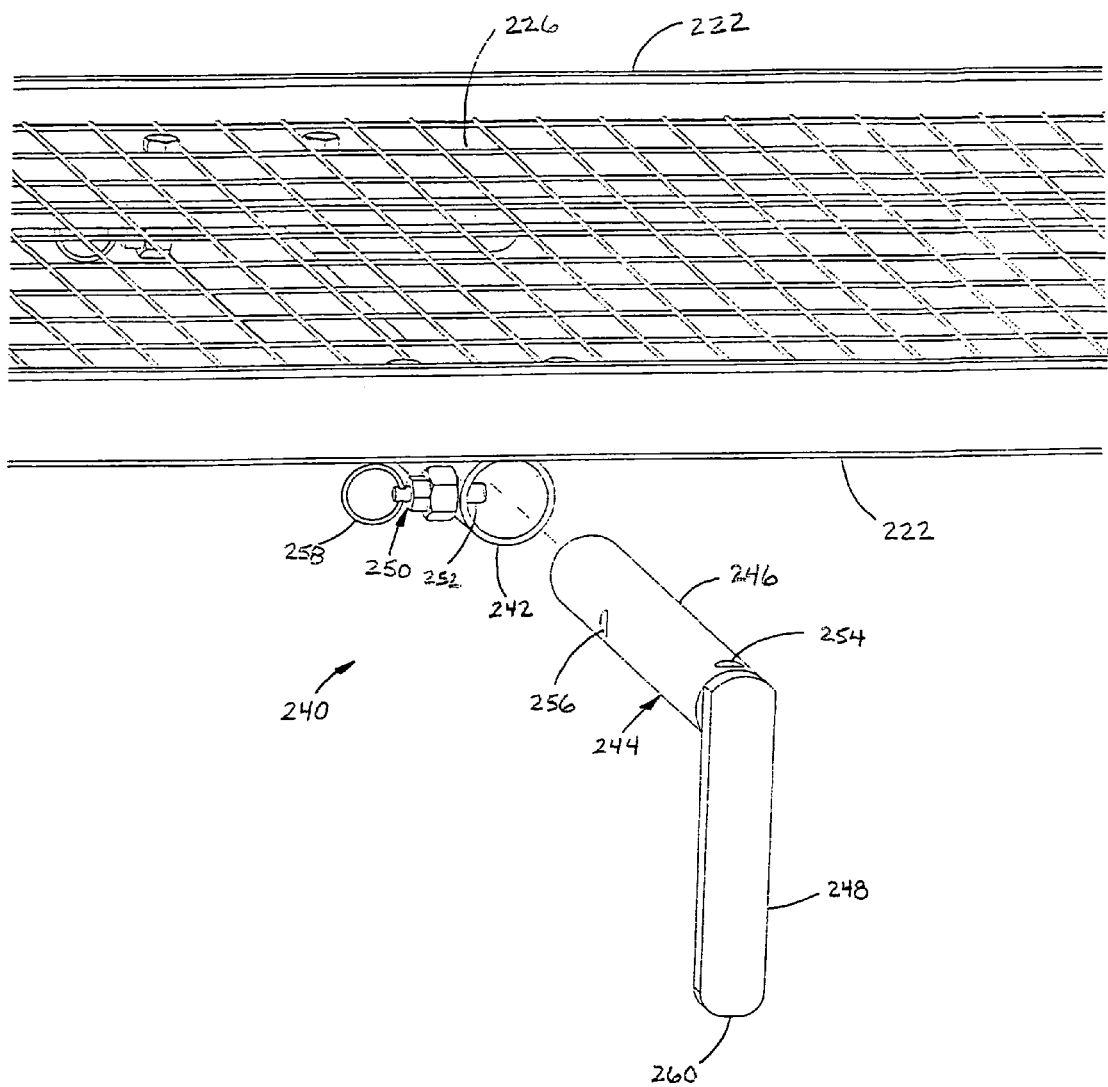
FIG. 19 is a partial perspective view of the plant transportation and display rack of FIGS. 13-15, showing the configuration of one of the stabilizing legs thereof in greater detail.

As can be seen more clearly in FIG. 19, a spring-loaded locking pin 250 is mounted proximate each end of the transverse tube 242 of the stabilizer assembly, and includes a horizontally-extending distal end 252 that is biased towards the interior of the tube. The shaft portion 246 of the pivoting stabilizer member, in turn, includes a first and second bores 254, 256 that are sized to receive the end 252 of the pin in locking engagement therewith; the first bore 254 is formed proximate the outer end of the shaft, on an axis generally parallel to that of the stabilizer leg 248, while the other bore 256 is formed towards the inner end of the shaft, on an axis at a right angle to the stabilizer leg.

Accordingly, to deploy the stabilizer members, the operator pulls outwardly on the finger ring 258 of the spring-loaded locking pin 250, so as to disengage the pin from bore 254. The stabilizer is then drawn outwardly from tube 242 and pivoted to the vertical orientation that is shown in FIG. 19, at which point the operator releases the locking pin so that its end 252 is biased into engagement with the second bore 256. In the vertical, deployed configuration, the lower end 260 of the stabilizer leg is positioned at or slightly above the ground/floor surface, so as to immediately arrest any tipping motion.

The stabilizers are retracted and stored in a horizontal orientation by reversing the above steps, so that the end of the locking pin is received in bore 254. It will be understood that the locking pin may be arranged at different angles (e.g., vertically) on tube 242, and that the angles of the locking bores may be aligned correspondingly. It will also be understood that other forms of stabilizer mechanisms may be used in some embodiments.

FIGS. 20-27 show a plant transportation and storage rack assembly in accordance with another embodiment of the present invention. As compared with the embodiments described above, a particular advantage of the embodiment shown in FIGS. 20-27 is s increased use of economical bent-wire construction, in both the tray units and guide tracks of the assembly.

Figure 20:
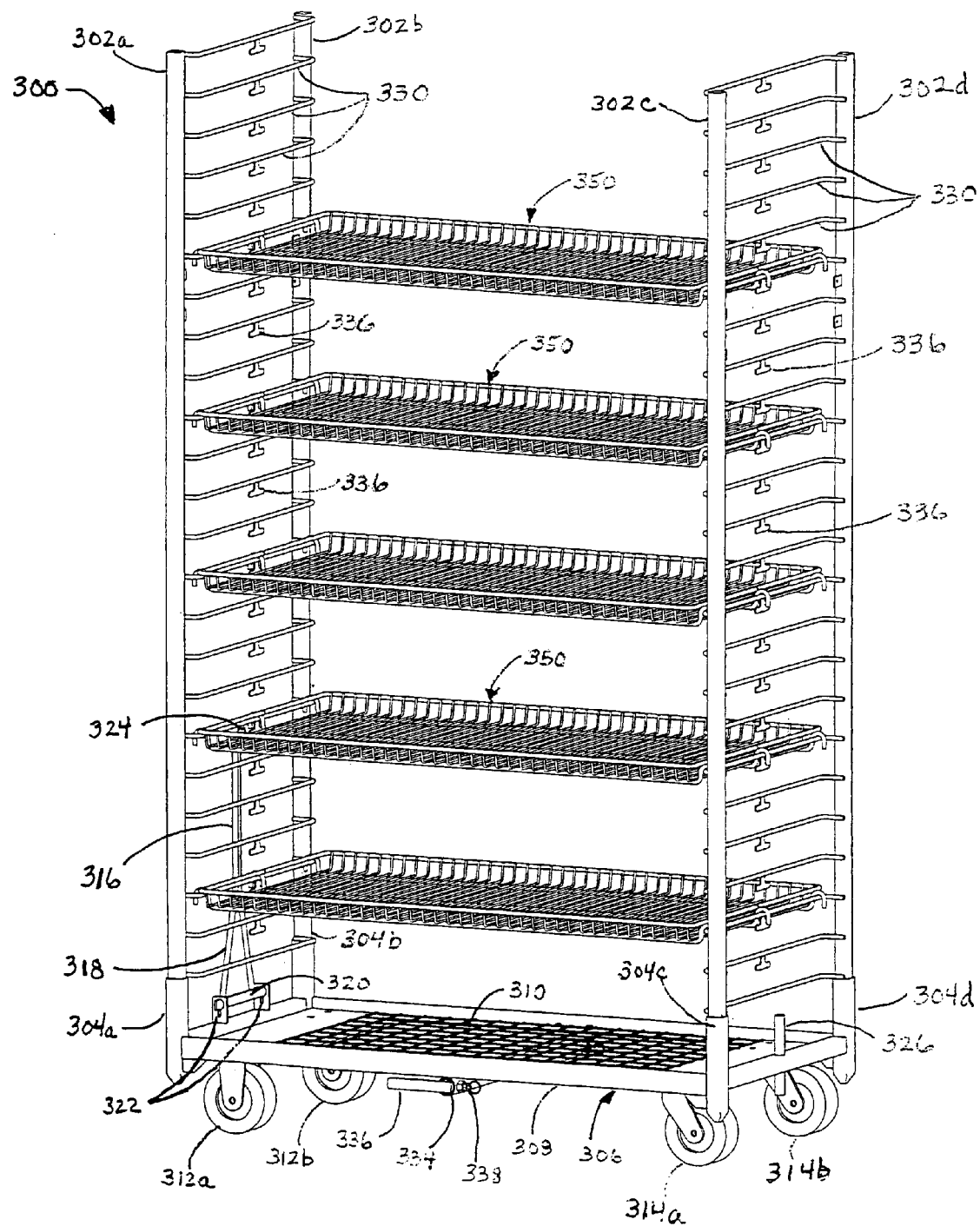
FIG. 20 is a perspective view of a plant transportation and display rack in accordance with a third embodiment of the present invention, showing the rack in its retracted configuration.

Accordingly, as can be seen in FIG. 20 and also FIG. 21, a rack assembly 300 in accordance with this embodiment is somewhat similar in overall configuration to that described with reference to FIGS. 13-19, in that the assembly includes four stationary, upright post members 302*a*-*d* having lower ends that are detachably received in upwardly-facing, generally sleeve-shaped corner sockets 304*a*-*d* on a wheeled cart base 306. The cart base includes a generally rectangular frame 308 surrounding a fixed bottom tray 310, and pairs of fixed and caster-mounted wheels 312*a*-*b* and 314*a*-*b* at the forward and rearward ends. A tow bar 316, similar to that described above, is mounted at the front of the cart by a yoke portion 318 mounted to a transverse axle 320 that is received in cooperating bores in a pair of upwardly projecting flanges 322 on the frame, so that the tow bar is pivotable between a vertical, stowed position and a horizontal deployed position; a hitch ring 324 on the distal end of the tow bar can be dropped over a cooperating vertical pin 326 at the rearward end of an adjoining rack assembly to form a connection that allows a plurality of the carts to be joined together and pulled from one location to another in a train-like manner. Also included are a pair of stabilizer assemblies 330 on opposite sides of the cart; similar to those described above, each of the stabilizer assemblies includes a shaft portion 332 (see FIGS. 24-25) that is pivotally received in cross tube 334 so that a leg portion 336 on a distal end thereof is pivotable between a horizontal and vertical position, and that is selectively locked in place by a spring-loaded pin 338 that is mounted to the cross tube and that cooperatingly engages a bore in the pivot shaft 332.

As noted above, a particular advantage of the embodiment shown in FIGS. 20-27 is its extensive use of wire/rod construction, which can be substantially less expensive than construction using sheet metal fabrication.

Figure 21:
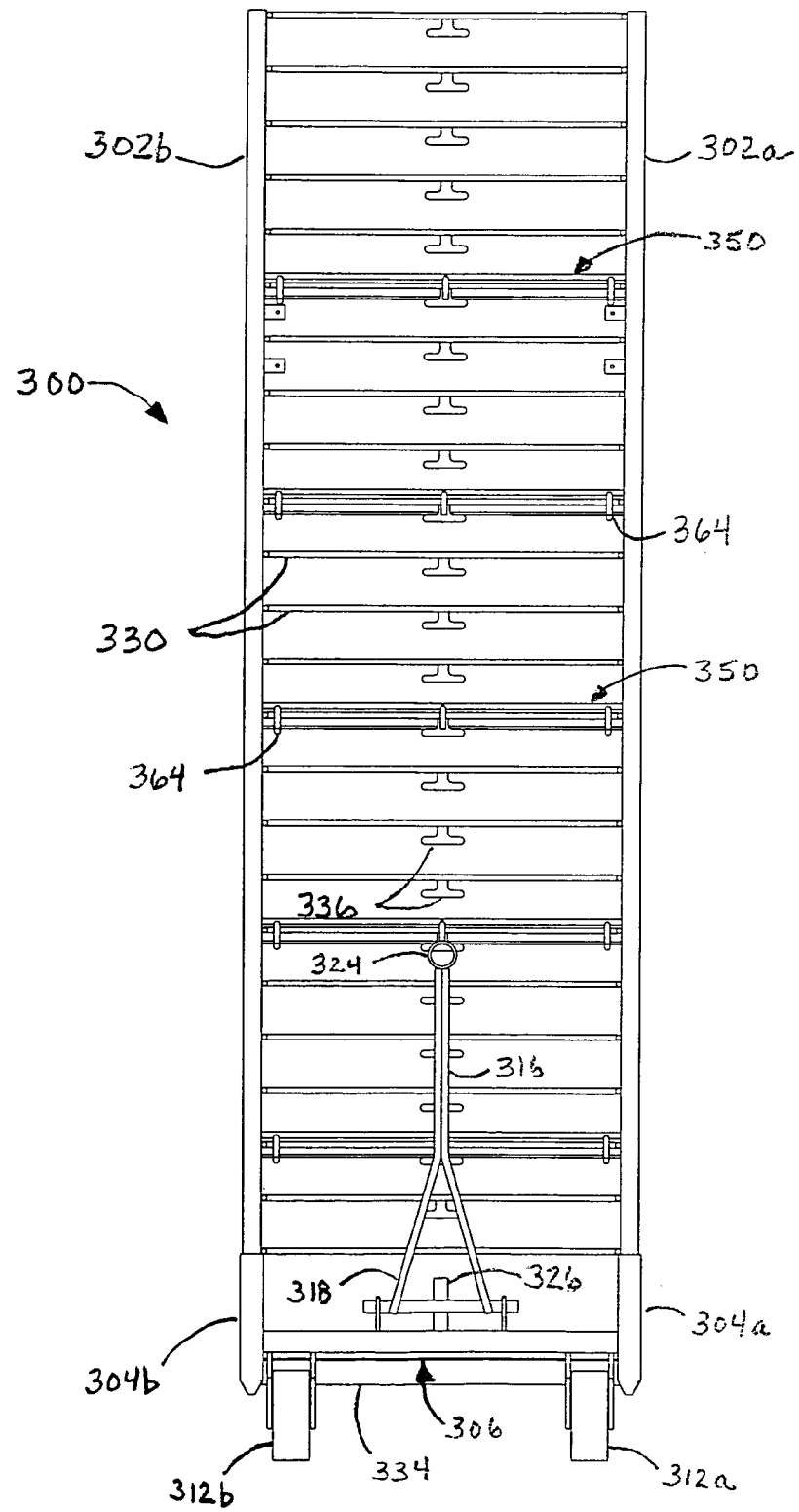
FIG. 21 is an end elevational view of the plant transportation and display rack of FIG. 20, showing in greater detail the relationship of the trays when in the retracted configuration.
Figure 22:
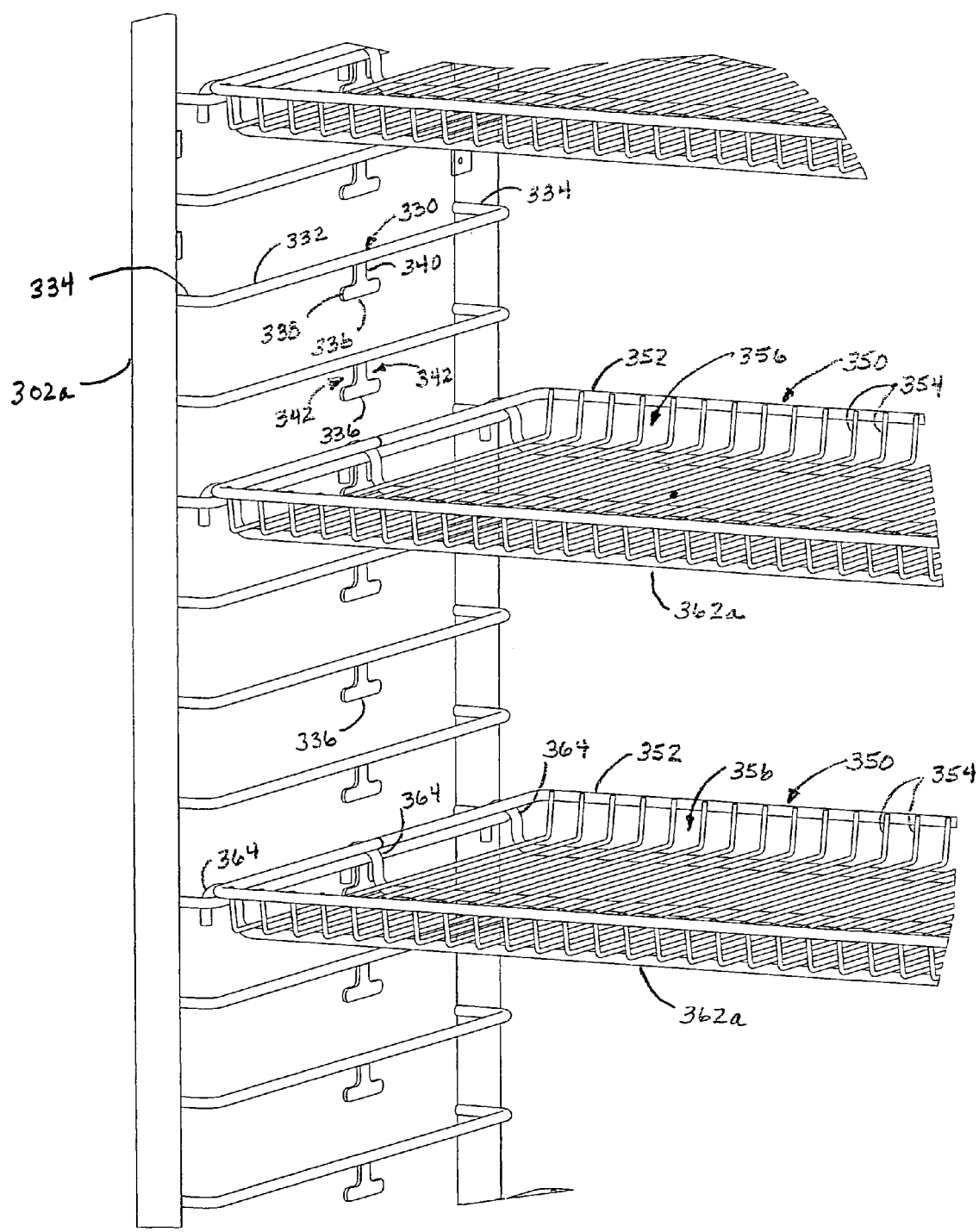
FIGS. 22 and 23 are partial perspective views of the transportation and display rack of FIGS. 20-21, showing in greater detail the relationship of the sliding wire trays and the stationary components of the rack when in the retracted configuration.

For example, as can be seen in FIGS. 20-22, a plurality of parallel, vertically-spaced guide bars 330 are mounted across the end pairs of vertical supports 302*a*-*b* and 302*c*-*d*, in place of the sheet metal channel-type guides of the embodiment described above. As can better be seen in FIGS. 22-23, each of the guide bars 330 includes a substantially straight, horizontal main span 332 that extends between the paired post members 302*a*-*b* and 302*c*-*d*, and a pair of shorter, substantially parallel leg portions 334 that extend from the main span of the rod and are welded or otherwise mounted to the post members, the length of the leg portions being such that the main span is spaced inwardly therefrom so as to provide clearance for the end hooks of the sliding storage/display trays, as will be described in greater detail below. A depending bracket 336 is mounted proximate the midpoint of the main run 332 of each guide bar and has an inverted T-shaped configuration with a horizontally elongate head portion 338 extending generally parallel to the main run of the bar, and a stem portion 340 that is mounted to the underside of the bar, so as to define first and second notch areas 342 on the upper sides of the bracket member that cooperate with the hooks of the storage trays in the manner described below. In the illustrated embodiment, the inverted T-shaped bracket is suitably formed as a simple metal punching, however, it will be understood that it may be formed of bent-wire or other construction as well.

Analogous to the guide channels of the embodiment described above, the guide bars 330 of the rack assembly 300 provide support for storage/display trays 350, that allow the trays to be arranged at various levels in the rack assembly and also allow them to be selectively shifted between retracted and deployed positions. As can be seen with further reference to FIGS. 22-23, each of the trays 350 is constructed entirely of bent-wire/rod material, with a generally rectangular rod frame 352 that is sized to fit the span and width of the support posts 302*a*-*d*, with clearance to permit sliding movement, with a series of finer, somewhat U-shaped bent-wire crossbars 352 being mounted between the long sides of the frame 352 to define a depressed shaft area 356 for holding the plants or other articles, the frame 352 forming a raised border around the shelf area 356 to retain the articles thereon. It will be understood that in some embodiments expanded metal mesh or other material may be substituted for the arrangement of transverse bars 354 to form the shelf area.

Figure 23:
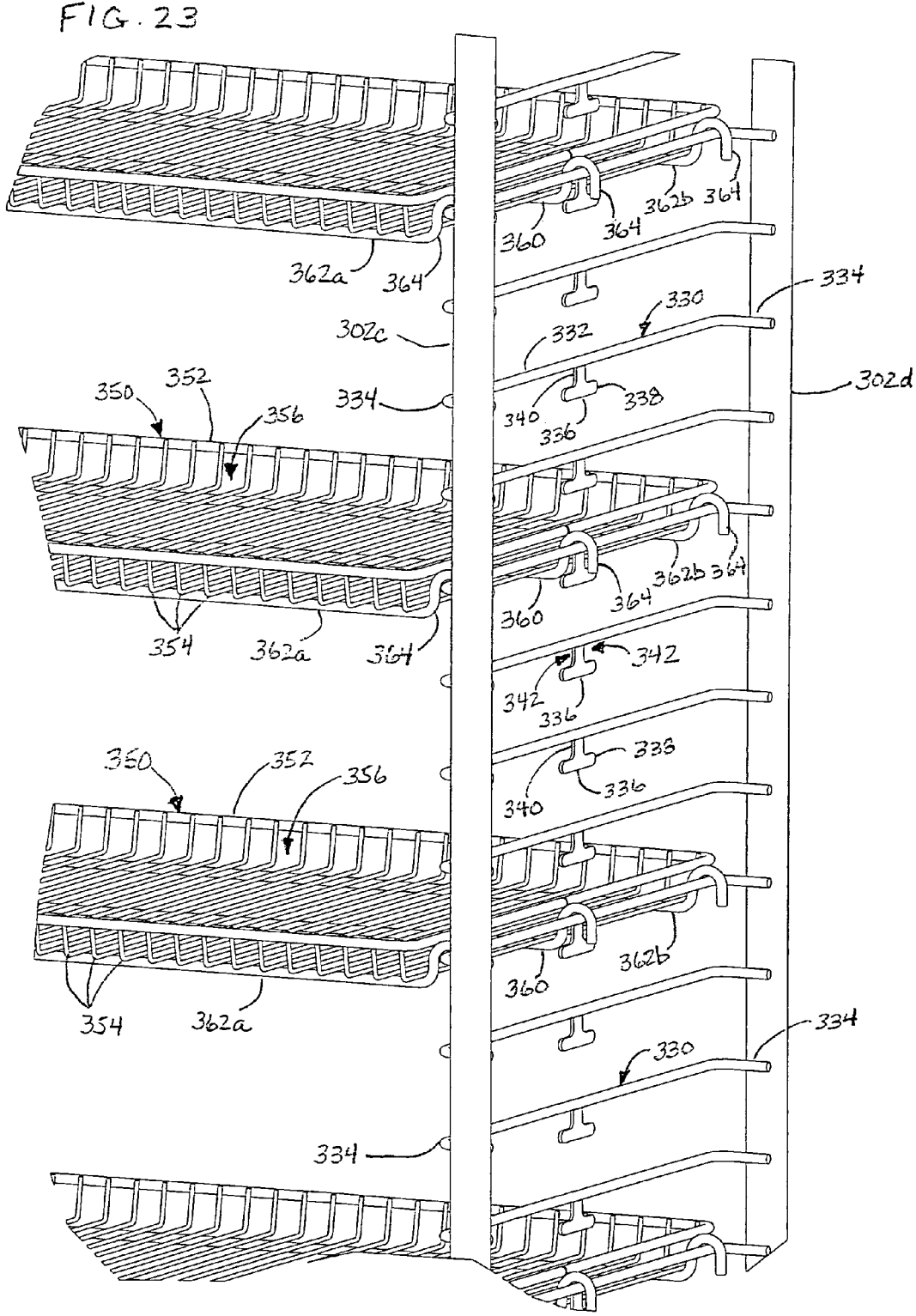

As can best be seen in FIG. 23, three lengthwise bar members, a central bar member 360 and parallel, flanking side bar members 362*a*-*b* extend across the bottom of the shelf area 356, with the outboard bar members 362*a*-*b* being located and generally proximate the outward sides of the rectangular frame 352. The lengthwise support bars 360 and 362*a*-*b* are formed of a heavier bent-rod, and apart from location are identical, each terminating in downwardly-opening hook portions 364 at both ends. The hook portions lie parallel to one another, and are sized to fit over the main spans 332 of the guide bars 330 so as to support the trays 350 therefrom. As can be seen in FIG. 23, the spacing between the outboard rods 362*a* and 362*b* is such that their respective hook portions 364 are positioned just inside the corners between the main span and the mounting legs 334 of the guide rods, so that the hooks cooperate with the mounting legs 334 to hold the trays steady and prevent them from shifting about when in the stowed configuration. The hook portions 364 of the central rod member 360, in turn, are aligned generally with the bracket members 336 of the associated guide rods when the tray is in the stowed position.

Thus, when the rack assembly 300 is in the stowed configuration, the trays 350 are maintained in a compact, stacked arrangement, similar to in the embodiments described above, and are held securely in place when the assembly is being wheeled about or transported.

Figure 24:
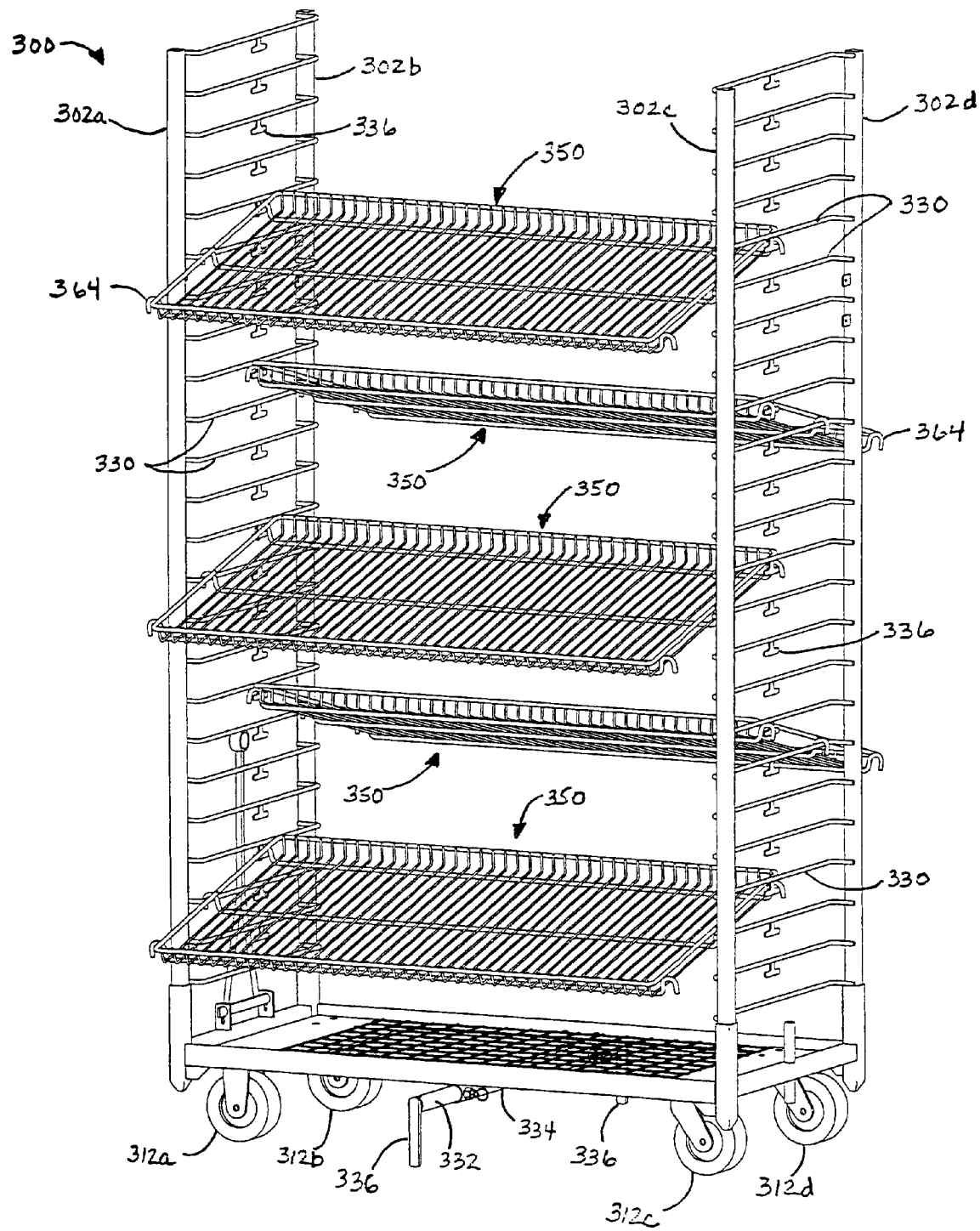
FIG. 24 is a second perspective view of the plant transportation and display rack of FIG. 20, showing the rack in its deployed configuration with the trays thereof extended to the sides on an alternating basis and tilted to the display position.

Then, when it is desired to display the plants or other articles, the trays 350 can be extended and tilted to place the rack assembly in the deployed configuration, as shown in FIG. 24. In so doing, the stabilizer assemblies 330 are preferably deployed to hold the rack assembly against tipping, by extending shafts 332 from cross tube 334 and rotating them so as to pivot the stabilizer arms 336 to a vertical position in which the lower ends thereof are located proximate the floor surface.

Figure 25:
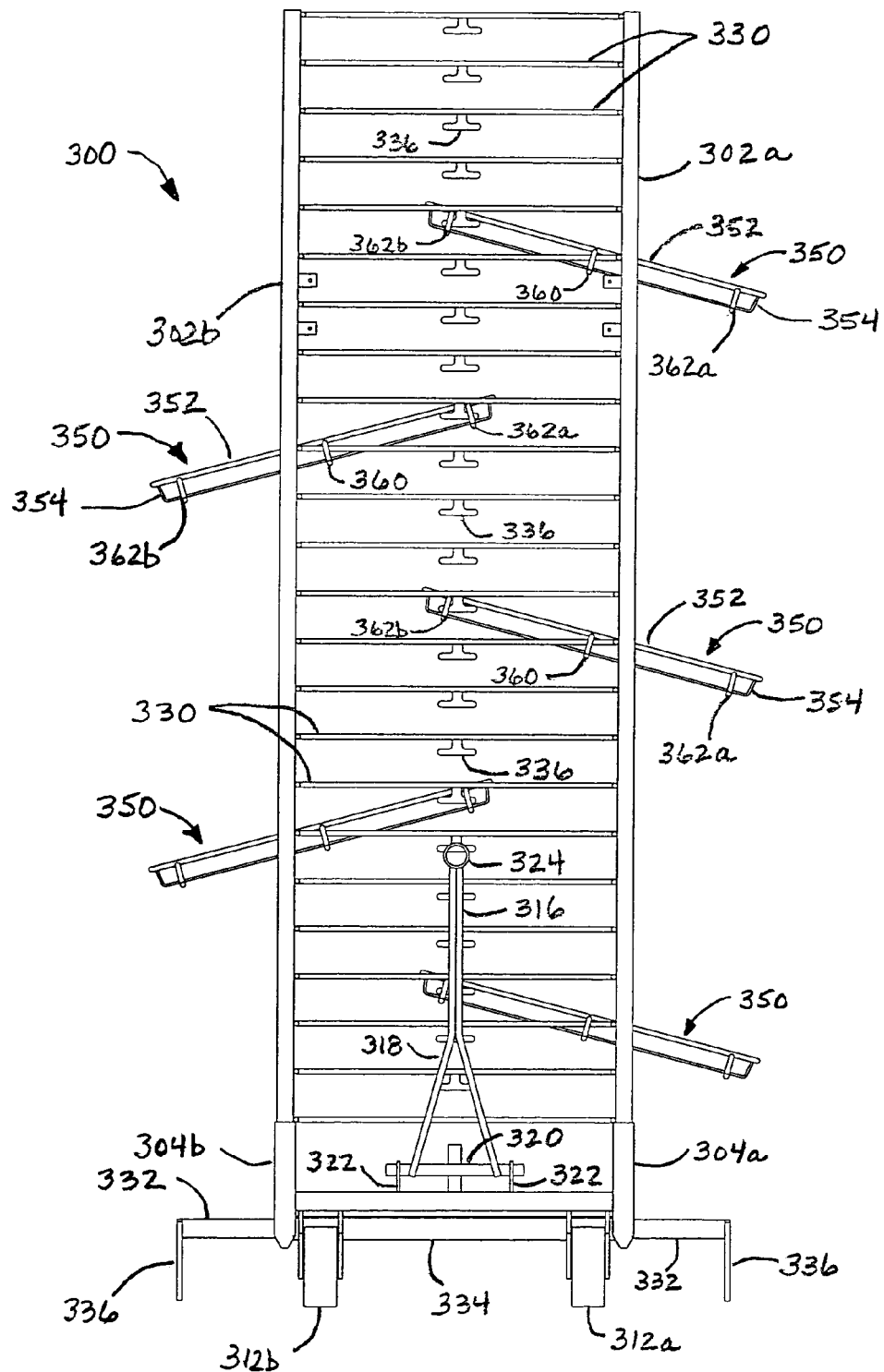
FIG. 25 is a second end elevational view of the plant transportation and display rack of FIG. 20, showing the arrangement of the trays in the extended, deployed position in greater detail.
Figure 26:
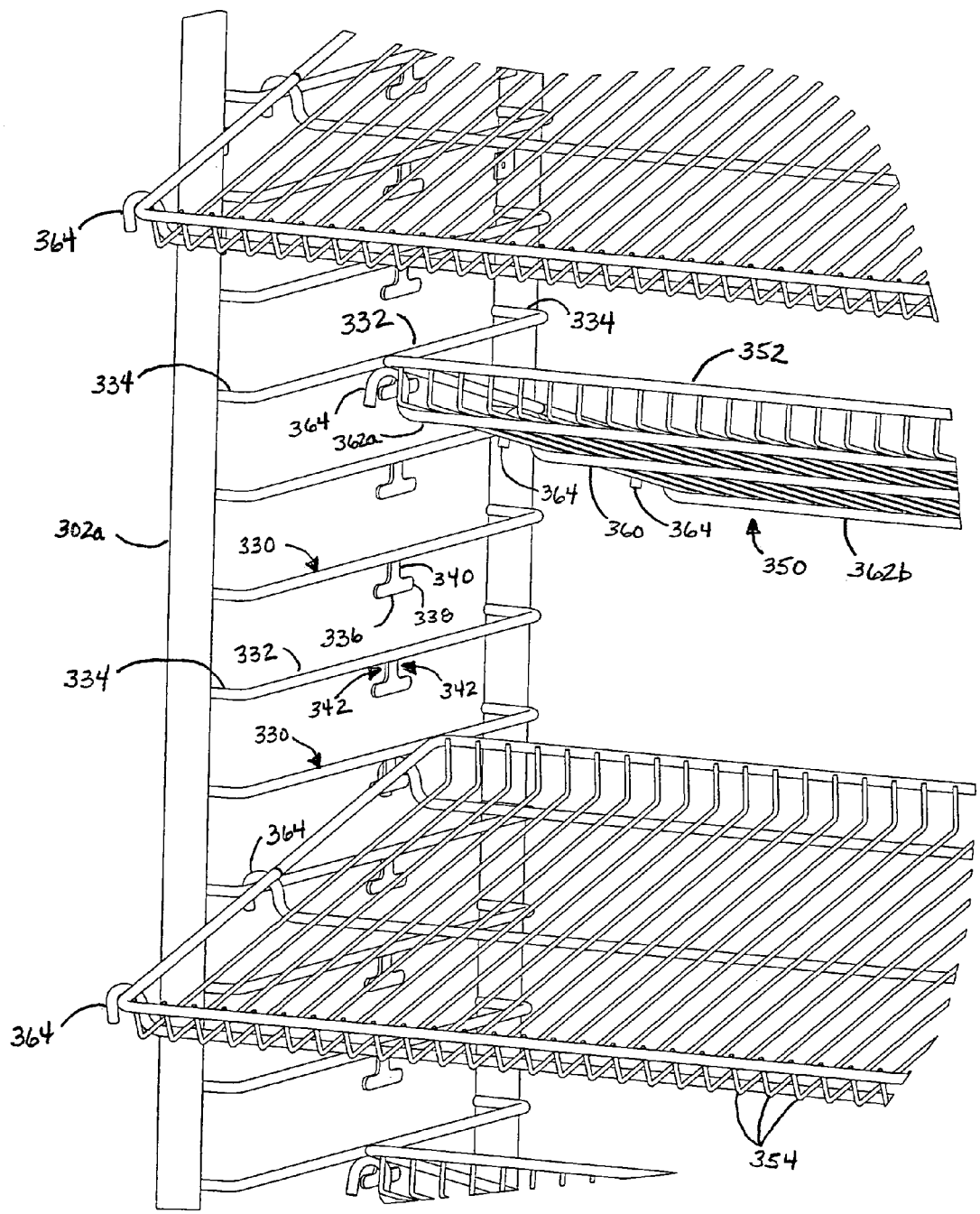
FIGS. 26 and 27 are partial perspective views of the plant transportation and display rack of FIGS. 20-25, showing in greater detail the cooperation of the sliding trays with the stationary components thereof when in the deployed configuration.
Figure 27:
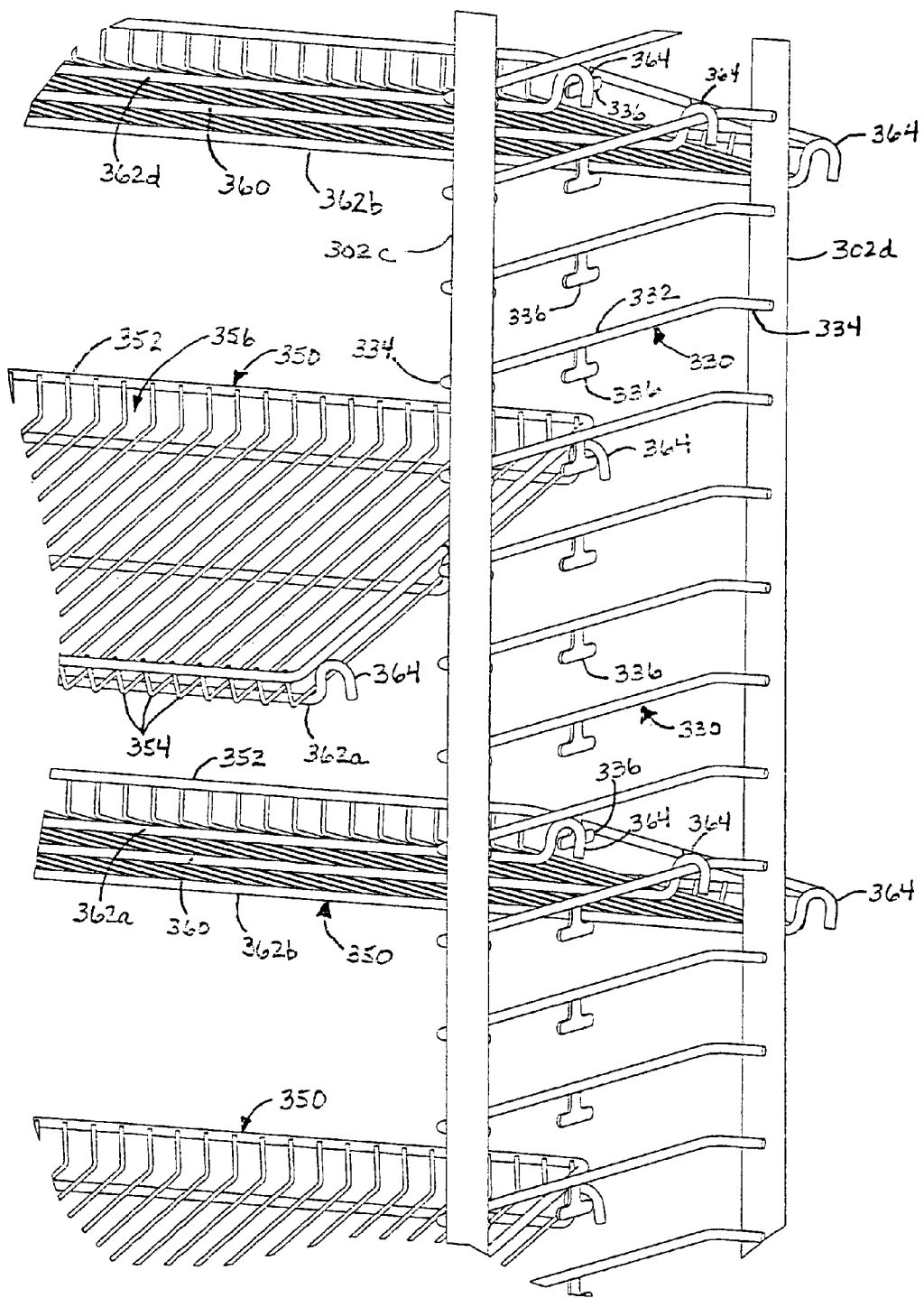

To extend and tilt a tray, the operator selects a side of the tray and lifts the hook portions 364 of the support bar 362*a* or 362*b* on that side off of the main span 332 of the guide rod and over the associated mounting legs 334. The operator then slides the tray outwardly, with the hook portions 364 of the two other support bars sliding along the main span of the guide bar 330. As the hook portion 364 of the middle guide bar 360 approaches the front of the rack, the operator presses downwardly on the extended edge of the tray, causing it to pivot about the hook portions 364 of the middle support bar so as to lift the opposite edge and thereby raise the hook portions of the trailing support bar 362*a* or 362*b*. With continued forward motion of the tray, the hook portions 364 of the raised bar slip into one or the other of the notches 342 behind the stem of the support bracket, so that the raised hook portions rest atop the head 338 of the inverted T-shaped bracket so as to maintain the tray in the angled position as shown in FIGS. 24-27. As with the embodiments described above, the trays are preferably extended on opposite sides of the rack assembly on an alternating basis, as seen in FIGS. 24-25, so as to maintain balance of the assembly, but it will be understood that other arrangements may be used, such as alternating pairs, trios, etc. of the trays, or random arrangements or even with all of the trays extended to one side if desired.

As noted above, a significant advantage of the embodiment of the invention illustrated in FIGS. 22-27 is the increased use of bent-wire components in construction of the assembly. In particular, the guide and support rods and the tray units 350 are all formed entirely of bent-wire/rod material, with the exception of the tab-like support brackets 336 which are suitably spot welded to the guide rods; this form of construction is significantly faster and less expensive than that used in the embodiments described above, although it will be understood that the latter possess certain advantages as well. Mild steel with a corrosive-resistant coating is eminently suitable for use in construction of the rack assembly, although it will be understood that other suitable materials may also be used.

The rack assemblies of the present invention have been described herein in the context of transportation and display of plants, which is their primary intended use; it will be understood that they may be employed with other articles.

It is to be recognized that various alterations, modifications, and/or additions may be introduced into the constructions and arrangements of parts described above without departing from the spirit or ambit of the present invention.

What is claimed is:

1. A rack assembly for transportation and display of plants, said rack assembly comprising:
    a plurality of vertically extending supports;
    a mobile frame on which said supports are mounted that allows movement of said rack assembly;
    a plurality of wheels that support said mobile frame for rolling movement;
    a plurality of trays for holding said plants;
    means for slidingly mounting said trays to said supports, so that said trays are selectively extensible from a retracted position in which said trays are arranged in a compact, vertically spaced relationship, to a deployed position in which said trays extend on opposite sides of said supports in an alternating arrangement and with increased vertical spacing;
    means for tilting said trays in said deployed position, to a downwardly angled orientation in which said trays are readily accessible by customers and other personnel; and
    at least one stabilizer assembly that prevents tipping of said rack assembly when said trays are in said deployed position, said stabilizer assembly comprising:
    a tube member that is mounted to said mobile frame;
    first and second shaft members that are received in said tube member so as to be selectively extensible on opposite sides of said mobile frame; and
    first and second stabilizer legs each mounted on a respective outer end of said first and second shaft members that are selectively rotatable to be positioned proximate a ground surface when said shaft members are extended on opposite sides of said frame.

2. The rack assembly of claim 1, wherein said means for tilting said trays in said deployed position comprises:
    means for tilting all of said trays simultaneously to said downwardly angled orientation.

3. The rack assembly of claim 1, wherein said plurality of vertically extending supports comprise:
    attachment features that form a sliding engagement with said trays.

4. The rack assembly of claim 2, wherein said means for tilting all of said trays simultaneously comprises:
    at least one vertically adjustable member that is operatively connected to rearward edges of said trays so as to raise said rearward ends of said trays to an inclined angle when said at least one adjustable member is lifted.

5. A rack assembly for transportation and display of plants, said rack assembly comprising:
    a plurality of vertically extending supports;
    a mobile frame on which said supports are mounted that allows movement of said rack assembly;
    a plurality of trays for holding said plants;
    means for slidingly mounting said trays to said supports, so that said trays are selectively extensible from a retracted position in which said trays are arranged in a compact, vertically spaced relationship, to a deployed position in which said trays extend on opposite sides of said supports in an alternating arrangement and with increased vertical spacing, said means for slidingly mounting said trays to said supports so that said trays are selectively extensible comprising:
    a plurality of substantially horizontal guide rods that are mounted to said vertically extending supports at first and second ends of said assembly; and
    a plurality of hook members at first and second ends of said trays that fit over said horizontal guide rods so as to support said trays in sliding engagement therewith; and
    means for tilting said trays in said deployed position, to a downwardly angled orientation in which said trays are readily accessible by customers and other personnel, said means for tilting said trays in said deployed position comprising:
    bracket members mounted above said horizontal guide rods having said trays in sliding engagement therewith and having first and second openings on opposite sides that receive selected portions of said hook members so as to support said trays in said downwardly angled orientation;
    said depending bracket members being mounted proximate midpoints of said horizontal guide rods and depending from said horizontal guide rods so as to be positioned above said guide rods having said trays in sliding engagement therewith;
    said bracket members each comprising:
    a generally inverted T-shaped bracket member having a depending stem portion that is mounted to one of said guide rods and a crosswise head portion that extends from a lower end of said stem portion generally parallel to said guide rod, said first and second openings of said bracket member being formed above said crosswise head portion on opposite sides of said stem portion.

6. A rack assembly for transportation and display of plants, said rack assembly comprising:
    a plurality of vertically extending supports;
    a mobile frame on which said supports are mounted that allows movement of said rack assembly;
    a plurality of trays for holding said plants;
    means for slidingly mounting said trays to said supports, so that said trays are selectively extensible from a retracted position in which said trays are arranged in a compact, vertically spaced relationship, to a deployed position in which said trays extend on opposite sides of said supports in an alternating arrangement and with increased vertical spacing, said means for slidingly mounting said trays to said supports so that said trays are selectively extensible comprising:

a plurality of substantially horizontal guide rods that are mounted to said vertically extending supports at first and second ends of said assembly; and a plurality of hook members at first and second ends of said trays that fit over said horizontal guide rods so as to support said trays in sliding engagement therewith;

means for tilting said trays in said deployed position, to a downwardly angled orientation in which said trays are readily accessible by customers and other personnel, said means for tilting said trays in said deployed position comprising:

bracket members mounted above said horizontal guide rods having said trays in sliding engagement therewith and having first and second openings for receiving selected portions of said hook members so as to support said trays in said downwardly angled orientation, said depending bracket members being mounted proximate midpoints of said horizontal guide rods and depending from said horizontal guide rods so as to be positioned above said guide rods having said trays in sliding engagement therewith;

said plurality of hook members at said first and second ends of said trays that fit over said guide rods comprising:

first and second outboard hook members at each end of said trays, said outboard hook members being located proximate first and second lateral edges of said sliding trays; and a middle hook member located intermediate said support bracket at each end of said trays so that in response to an extended lateral edge of a sliding tray being depressed when extended in said displayed position said middle hook member reacts against said guide rod to form a fulcrum such that an opposite lateral edge of said tray is raised so that said outboard hook members proximate thereto are positioned to enter said respective first or second openings of said support brackets above said tray.

7. The rack assembly of claim 6, wherein said trays each further comprise:

middle and outboard support rods extending longitudinally beneath a shelf area of said tray and having said middle and outboard hook members formed on ends respective thereof.

* * * * *